(12) United States Patent
Fujishiro et al.

(10) Patent No.: US 11,310,631 B2
(45) Date of Patent: Apr. 19, 2022

(54) RADIO TERMINAL AND BASE STATION

(71) Applicant: KYOCERA CORPORATION, Kyoto (JP)

(72) Inventors: Masato Fujishiro, Yokohama (JP); Henry Chang, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 89 days.

(21) Appl. No.: 16/365,438

(22) Filed: Mar. 26, 2019

(65) Prior Publication Data
US 2019/0222969 A1    Jul. 18, 2019

Related U.S. Application Data

(63) Continuation of application No. PCT/JP2017/034903, filed on Sep. 27, 2017.
(Continued)

(51) Int. Cl.
*H04W 4/06* (2009.01)
*H04W 68/00* (2009.01)
(Continued)

(52) U.S. Cl.
CPC ............ *H04W 4/06* (2013.01); *H04W 36/04* (2013.01); *H04W 48/16* (2013.01);
(Continued)

(58) Field of Classification Search
CPC ..... H04W 4/06; H04W 48/16; H04W 68/005; H04W 36/04; H04W 88/02; H04W 88/08; H04W 48/20; H04W 36/0007; H04W 76/19; H04W 76/18; H04W 76/40; Y02D 30/70
See application file for complete search history.

(56) References Cited

U.S. PATENT DOCUMENTS

2012/0099419 A1* 4/2012 Kim ................. H04L 1/1854
370/216
2014/0204894 A1 7/2014 Chang et al.
(Continued)

FOREIGN PATENT DOCUMENTS

| WO | 2013/024802 A1 | 2/2013 |
| WO | 2015/116870 A1 | 8/2015 |
| WO | 2016/122193 A1 | 8/2016 |

OTHER PUBLICATIONS

3GPP TS 36.331 V13.2.0 (Jun. 2016), 4 pages (Year: 2016).*
(Continued)

*Primary Examiner* — Sharmin Chowdhury
(74) *Attorney, Agent, or Firm* — Studebaker & Brackett PC

(57) ABSTRACT

A radio terminal according to one embodiment comprises: a receiver configured to receive an MBMS service distributed from a base station by using a coverage enhancement technique including a repetition; a controller configured to determine whether or not a predetermined event occurs; and a transmitter configured to transmit a notification on a coverage enhancement level required by the radio terminal to the base station, in response to occurrence of the predetermined event. The predetermined event includes transmission of the notification being requested from the base station or normal reception of the MBMS service not being possible.

8 Claims, 19 Drawing Sheets

Related U.S. Application Data

(60) Provisional application No. 62/402,161, filed on Sep. 30, 2016.

(51) Int. Cl.
  *H04W 36/04* (2009.01)
  *H04W 48/16* (2009.01)
  *H04W 88/02* (2009.01)
  *H04W 88/08* (2009.01)

(52) U.S. Cl.
  CPC .......... *H04W 68/005* (2013.01); *H04W 88/02* (2013.01); *H04W 88/08* (2013.01); *Y02D 30/70* (2020.08)

(56) References Cited

U.S. PATENT DOCUMENTS

| | | | | |
|---|---|---|---|---|
| 2016/0353440 | A1* | 12/2016 | Lee | H04W 72/0453 |
| 2017/0026863 | A1* | 1/2017 | Wang | H04L 5/0048 |
| 2018/0063722 | A1* | 3/2018 | Lee | H04L 1/08 |
| 2018/0332566 | A1* | 11/2018 | You | H04W 72/042 |
| 2019/0174270 | A1* | 6/2019 | Shan | H04W 4/70 |
| 2019/0208369 | A1* | 7/2019 | Kim | H04W 24/10 |
| 2020/0359421 | A1* | 11/2020 | Yi | H04L 5/0007 |

OTHER PUBLICATIONS

Ericsson. Overview of SC-PTM and common eMTC and NB-IoT aspects, 3GPP TSG-RAN WG2 #95, Tdoc R2-165636, Aug. 22-26, 2016, pp. 1-11, Gothenburg, Sweden.

Ericsson. Random access for NB-IOT, 3GPP TSG-RAN WG2 Meeting NB-IOT ad-hoc, R2-160470, Jan. 19-21, 2016, pp. 1-7, Budapest, Hungary.

Qualcomm Incorporated, RLM enhancements in Further enhanced MTC, 3GPP TSG-RAN WG4 Meeting #80, R4-166625, Aug. 22-26, 2016, pp. 1-3, Gothenburg, Sweden.

Catt, Multicast for NB-IoT and eMTC, 3GPP TSG RAN WG2 Meeting #95, R2-164767, Aug. 22-26, 2016, pp. 1-6, Gothenburg, Sweden.

Samsung, Paging reception procedure in the enhanced coverage mode, 3GPP TSG RAN WG2 #91, R2-153448, Aug. 24-28, 2015, pp. 1-4, Beijing, P.R. China.

Huawei and HiSilicon, How to define the extent of coverage enhancement, 3GPP TSG RAN WG1 Meeting #82, R1-153748, Aug. 24-28, 2015, pp. 1-5, Beijing, China.

\* cited by examiner

FIG. 9

```
SystemInformationBlockType20 information element

-- ASN1START

SystemInformationBlockType20-r13 ::=    SEQUENCE {
    sc-mcch-RepetionPeriod-r13          ENUMERATED {rf2, rf4, rf8, rf16, rf32, rf64, rf128, rf256),
    sc-mcch-Offset-r13                  INTEGER (0..10),
    sc-mcch-FirstSubframe-r13           INTEGER (0..9),
    sc-mcch-duration-r13                INTEGER (2..9) OPTIONAL,
    sc-mcch-ModificationPeriod-r13      ENUMERATED {rf2, rf4, rf8, rf16, rf32, rf64, rf128, rf256,
                                            rf512, rf1024, r2048, rf4096, rf8192, rf16384, rf32768,
                                            rf65536),
    lateNonCriticalExtension            OCTET STRING                                OPTIONAL,
    ...
}

-- ASN1STOP
```

FIG. 10

SCPTMConfiguration message

```
-- ASN1START

SCPTMConfiguration-r13 ::=       SEQUENCE {
    sc-mtch-InfoList-r13             SC-MTCH-InfoList-r13,
    scptm-NeighbourCellList-r13      SCPTM-NeighbourCellList-r13    OPTIONAL,    -- Need OP
    lateNonCriticalExtension         OCTET STRING                   OPTIONAL,
    nonCriticalExtension             SEQUENCE {}                    OPTIONAL
}

-- ASN1STOP
```

SC-MTCH-InfoList information element

```
-- ASN1START

SC-MTCH-InfoList-r13 ::=         SEQUENCE (SIZE (0..maxSC-MTCH-r13)) OF SC-MTCH-Info-r13

SC-MTCH-Info-r13 ::=             SEQUENCE    {
    mbmsSessionInfo-r13              MBMSSessionInfo-r13,
    g-RNTI-r13                       BIT STRING(SIZE(16)),
    sc-mtch-schedulingInfo-r13       SC-MTCH-SchedulingInfo-r13        OPTIONAL,    --
Need OP
    sc-mtch-neighbourCell-r13        BIT STRING (SIZE(maxNeighCell-SCPTM-r13))
    OPTIONAL,    -- Need OP
    ...
}

MBMSSessionInfo-r13 ::=          SEQUENCE    {
    tmgi-r13                         TMGI-r9,
    sessionId-r13                    OCTET STRING (SIZE (1))    OPTIONAL    -- Need OR
}

SC-MTCH-SchedulingInfo-r13::=    SEQUENCE    {
    onDurationTimerSCPTM-r13         ENUMERATED {
                                         psf1, psf2, psf3, psf4, psf5, psf6,
                                         psf8, psf10, psf20, psf30, psf40,
                                         psf50, psf60, psf80, psf100,
                                         psf200},
    drx-InactivityTimerSCPTM-r13     ENUMERATED {
                                         psf0, psf1, psf2, psf4, psf8,
                                         psf10, psf20, psf40,
                                         psf80, psf160, ps320,
                                         psf640, psf960,
                                         psf1280, psf1920, psf2560},
    schedulingPeriodStartOffsetSCPTM-r13    CHOICE {
        sf10                             INTEGER(0..9),
        sf20                             INTEGER(0..19),
        sf32                             INTEGER(0..31),
        sf40                             INTEGER(0..39),
        sf64                             INTEGER(0..63),
        sf80                             INTEGER(0..79),
        sf128                            INTEGER(0..127),
        sf160                            INTEGER(0..159),
        sf256                            INTEGER(0..255),
        sf320                            INTEGER(0..319),
        sf512                            INTEGER(0..511),
        sf640                            INTEGER(0..639),
        sf1024                           INTEGER(0..1023),
        sf2048                           INTEGER(0..2048),
        sf4096                           INTEGER(0..4096),
        sf8192                           INTEGER(0..8192)
    },
    ...
}

-- ASN1STOP
```

```
-- ASN1START

SCPTM-NeighbourCellList-r13 ::=  SEQUENCE (SIZE (1..maxNeighCell-SCPTM-r13)) OF PCI-ARFCN-r13

PCI-ARFCN-r13 ::=                SEQUENCE {
    physCellId-r13                   PhysCellId,
    carrierFreq-r13                  ARFCN-ValueEUTRA-r9    OPTIONAL
}

-- ASN1STOP
```

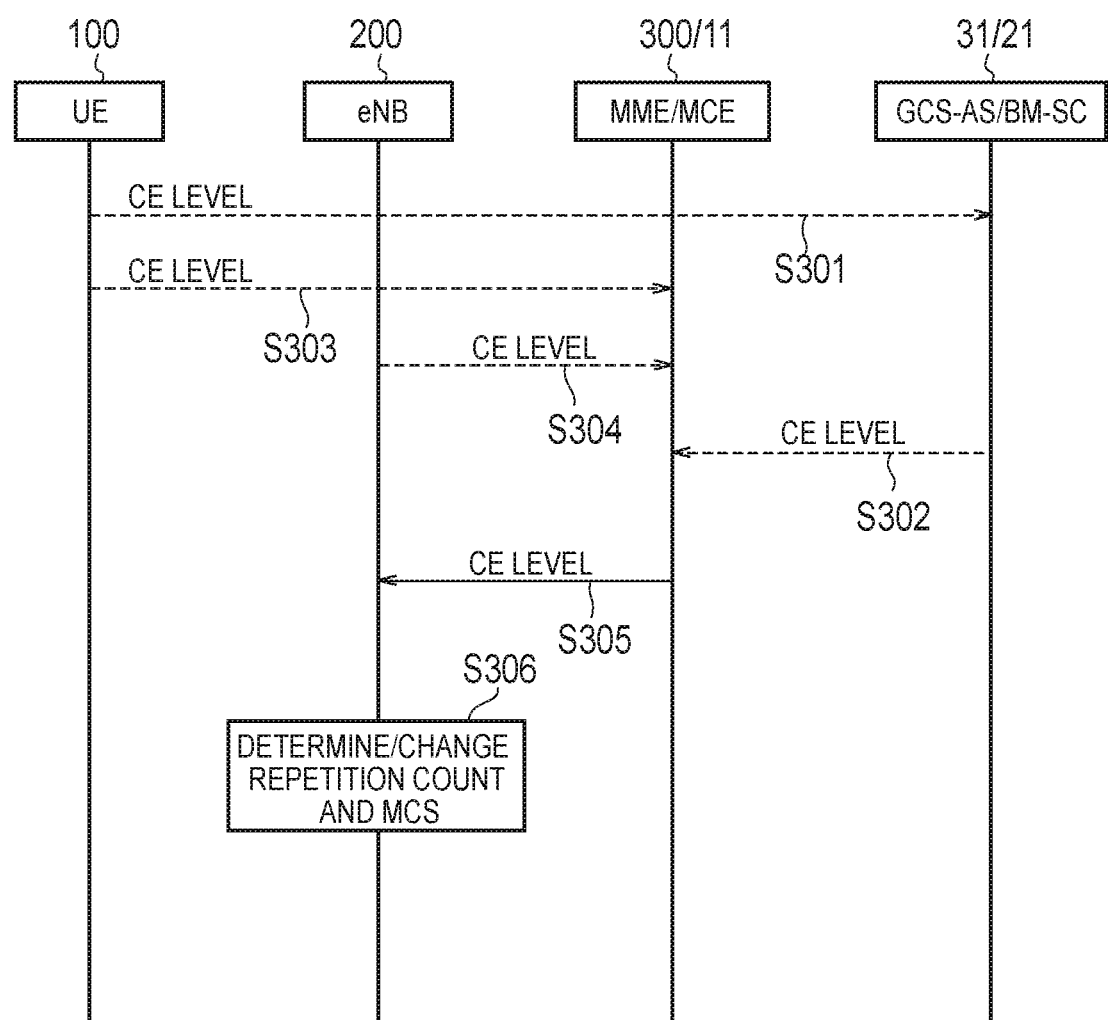

RADIO TERMINAL AND BASE STATION

CROSS-REFERENCE TO RELATED APPLICATION

The present application is a continuation based on PCT Application No. PCT/JP2017/034903 filed on Sep. 27, 2017, which claims the benefit of U.S. Provisional Application No. 62/402,161 (filed Sep. 30, 2016). The content of which are incorporated by reference herein in their entirety.

TECHNICAL FIELD

The present invention relates to a radio terminal and a base station for a mobile communication system.

BACKGROUND ART

In 3GPP (Third Generation Partnership Project), which is a project aiming to standardize a mobile communication system, the specifications of MBMS (Multimedia Broadcast Multicast Service) have been laid out to provide a radio terminal with a multicast/broadcast service. Radio transmission schemes for MBMS include two schemes: MBSFN (Multicast Broadcast Single Frequency Network) transmission and SC-PTM (Single Cell Point-To-Multipoint) transmission.

Meanwhile, radio terminals for MTC (Machine Type Communication) and IoT (Internet of Things) services, which perform communication without human intervention, have been studied. Such a radio terminal is required to achieve low cost, wide coverage area, and low power consumption. For this reason, in 3GPP, a category for radio terminals having a transmission and reception bandwidth limited to just a part of the system bandwidth (system transmission and reception band) is specified. A coverage enhancement technique including repetition is applied to a radio terminal in such a new category.

SUMMARY

A radio terminal according to one embodiment comprises: a receiver configured to receive an MBMS service distributed from a base station by using a coverage enhancement technique including a repetition; a controller configured to determine whether or not a predetermined event occurs; and a transmitter configured to transmit a notification on a coverage enhancement level required by the radio terminal to the base station, in response to occurrence of the predetermined event. The predetermined event includes transmission of the notification being requested from the base station or normal reception of the MBMS service not being possible.

A base station according to one embodiment comprises: a receiver configured to receive from a network device a notification about a coverage enhancement level to be applied to an MBMS service; and a controller configured to distribute the MBMS service by using a coverage enhancement technique including a repetition, based on the notification.

A radio terminal according to one embodiment comprise: a controller configured to perform a cell reselection operation for selecting a cell used as a serving cell. If a coverage enhancement technique including a repetition is required for the radio terminal, the controller selects the cell according to a ranking based on a radio quality. Even if the coverage enhancement technique is required for the radio terminal, if the radio terminal is receiving or interested in receiving an MBMS service, the controller preferentially selects the cell belonging to a frequency for distributing the MBMS service without using the ranking.

BRIEF DESCRIPTION OF THE DRAWINGS

FIG. 9 is a diagram illustrating an SIB 20 according to the embodiment.
FIG. 10 is a diagram illustrating SCPTM setting information (SCPTM Configuration) in SC-MCCH according to the embodiment.
FIG. 19 is a flowchart illustrating an operation example of a second embodiment.

Figure 1:
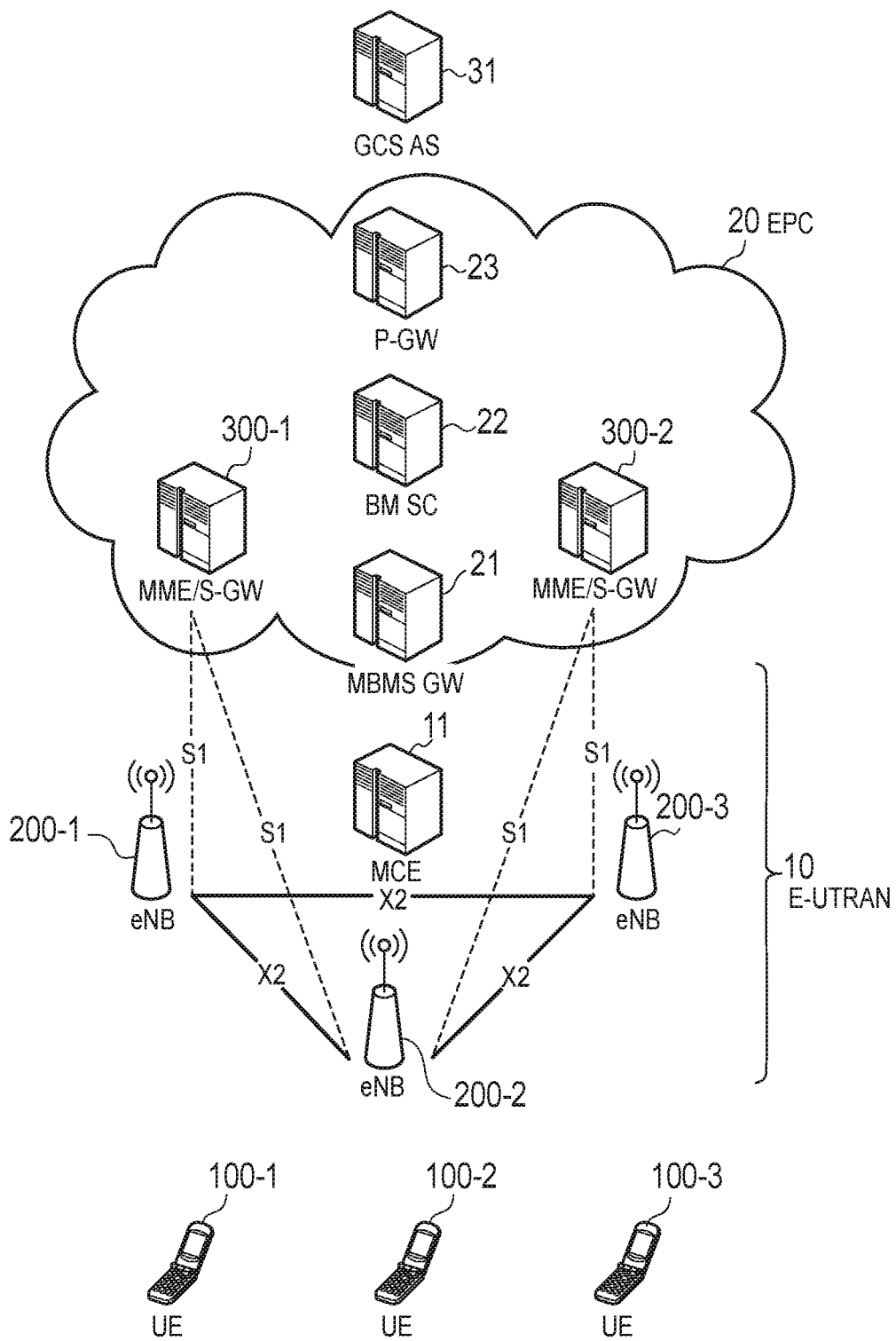
FIG. 1 is a diagram illustrating a configuration of an LTE system according to an embodiment.
Figure 2:
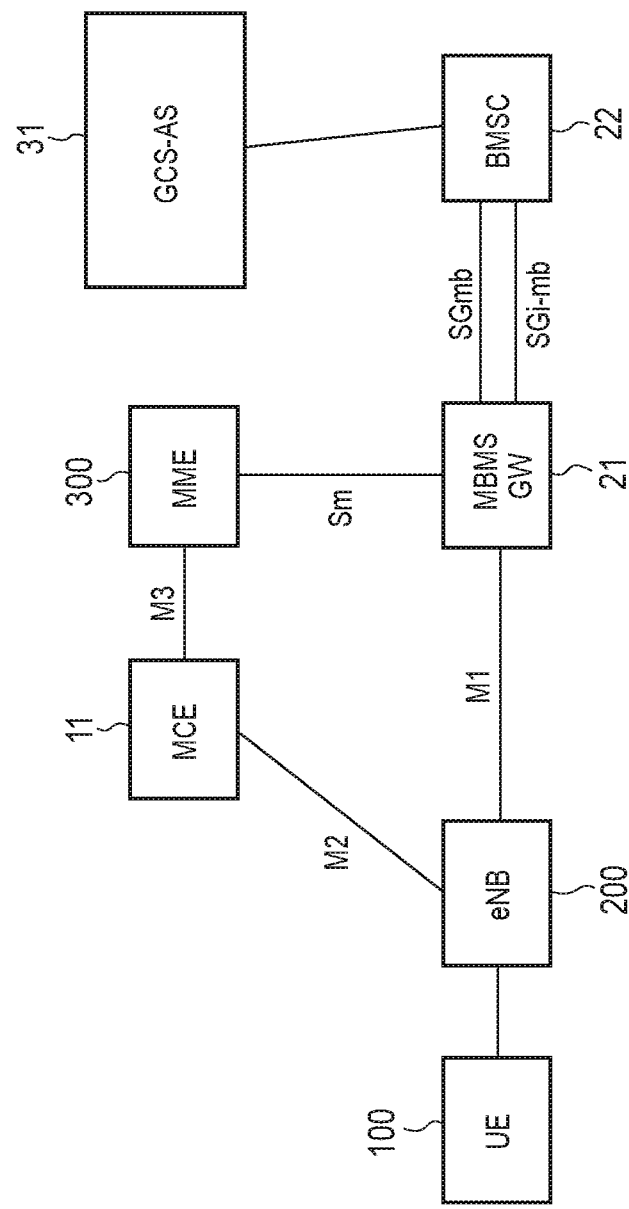
FIG. 2 is a diagram illustrating a network configuration for MBMS according to the embodiment.

DESCRIPTION OF THE EMBODIMENT (Mobile Communication System)
The configuration of the mobile communication system according to the embodiment will be described. The mobile communication system according to the embodiment is an LTE (Long Term Evolution) system whose specifications are defined in 3GPP. FIG. 1 is a diagram illustrating a configuration of the LTE system according to the embodiment. FIG. 2 is a diagram illustrating a network configuration for MBMS.

As illustrated in FIG. 1, the LTE system includes a radio terminal (UE: User Equipment) 100, a radio access network (E-UTRAN: Evolved-UMTS Terrestrial Radio Access Network) 10, and a core network (Evolved Packet Core) 20. The E-UTRAN 10 and the EPC 20 configure a network of the LTE system.

The UE 100 is a mobile communication device. The UE 100 performs radio communication with the eNB 200 that manages the cell (serving cell) in which the UE 100 exists.

The E-UTRAN 10 includes base stations (evolved Node-Bs) 200. The eNBs 200 are connected to each other via an X2 interface. The eNB 200 manages one or a plurality of cells and performs radio communication with the UE 100 that has established connection with a cell of the eNB 200. The eNB 200 has a radio resource management (RRM) function, a routing function of user data (hereinafter referred to simply as "data"), a measurement control function for mobility control/scheduling, and the like. "Cell" is used as a term indicating the smallest unit of radio communication area. "Cell" is also used as a term indicating a function or resource for performing radio communication with the UE 100.

The EPC 20 includes a mobility management entity (MME) and a serving gateway (S-GW) 300. The MME performs various mobility control and the like for the UE 100. The S-GW performs data transfer control. The MME/S-GW 300 is connected to the eNB 200 via an S1 interface.

Network entity for MBMS will be described. The E-UTRAN 10 includes an MCE (Multi-Cell/Multicast Coordinating Entity) 11. The MCE 11 is connected to the eNB 200 via an M2 interface. The MCE is connected to the MME 300 via an M3 interface (see FIG. 2). The MCE 11 performs MBSFN radio resource management/allocation and the like. Specifically, the MCE 11 performs scheduling of MBSFN transmission. On the other hand, the scheduling of the SC-PTM transmission is performed by the eNB 200.

The EPC 20 includes an MBMS GW (MBMS Gateway) 21. The MBMS GW 21 is connected to the eNB 200 via an M1 interface. The MBMS GW 21 is connected to the MME 300 via an Sm interface. The MBMS GW 21 is connected to the BM-SC 22 via an SG-mb and SGi-mb interfaces (see FIG. 2). The MBMS GW 21 performs IP multicast data transmission, session control and the like to the eNB 200.

The EPC 20 includes a BM-SC (Broadcast Multicast Service Center) 22. The BM-SC 22 is connected to the MBMS GW 21 via the SG-mb and SGi-mb interfaces. The BM-SC 22 is connected to the P-GW 23 via an SGi interface (see FIG. 2). The BM-SC 22 manages and allocates TMGI (Temporary Mobile Group Identity) and the like.

A GCS AS (Group Communication Service Application Server) 31 is provided in a network (that is, the Internet) outside the EPC 20. The GCS AS 31 is an application server for group communication. The GCS AS 31 is connected to the BM-SC 22 via an MB2-U interface and an MB 2-C interface. The GCS AS 31 is connected to the P-GW 23 via the SGi interface. The GCS AS 31 performs management of groups and data distribution etc. in group communication.

Figure 3:
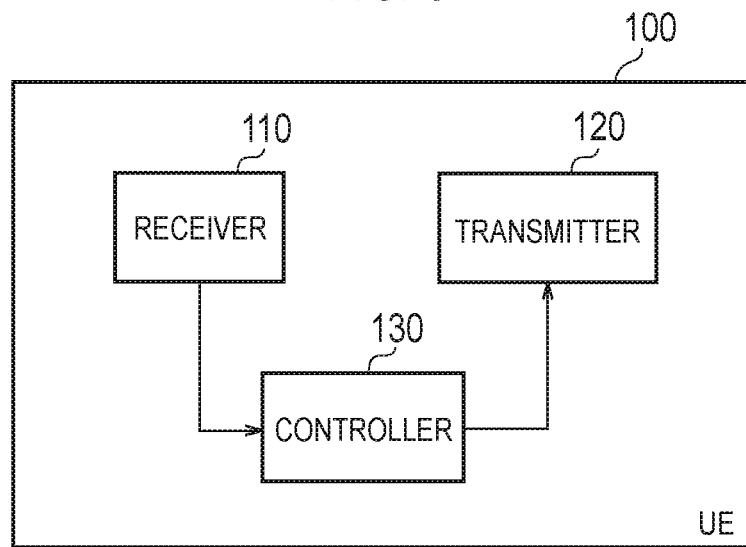
FIG. 3 is a diagram illustrating a configuration of a UE (radio terminal) according to the embodiment.

FIG. 3 is a diagram illustrating the configuration of the UE 100 (radio terminal) according to the embodiment. As illustrated in FIG. 3, the UE 100 includes a receiver 110, a transmitter 120, and a controller 130.

The receiver 110 performs various types of reception under the control of the controller 130. The receiver 110 includes antennas and a receiving machine. The receiving machine converts the radio signal received by the antennas into a baseband signal (reception signal). The receiving machine outputs the baseband signal to the controller 130.

The transmitter 120 performs various transmissions under the control of the controller 130. The transmitter 120 includes antennas and a transmitting machine. The transmitting machine converts a baseband signal (transmission signal) output from the controller 130 into a radio signal. The transmitting machine transmits the radio signal from the antennas.

The controller 130 performs various controls in the UE 100. The controller 130 includes a processor and a memory. The memory stores programs executed by the processor and information used for processing by the processor. The processor includes a baseband processor and a CPU (Central Processing Unit). The baseband processor performs modulation and demodulation, encoding, decoding, and the like of the baseband signal. The CPU performs various processes by executing programs stored in the memory. The processor may include a codec that performs encoding/decoding audio/video signals. The processor executes various processes to be described later.

Figure 4:
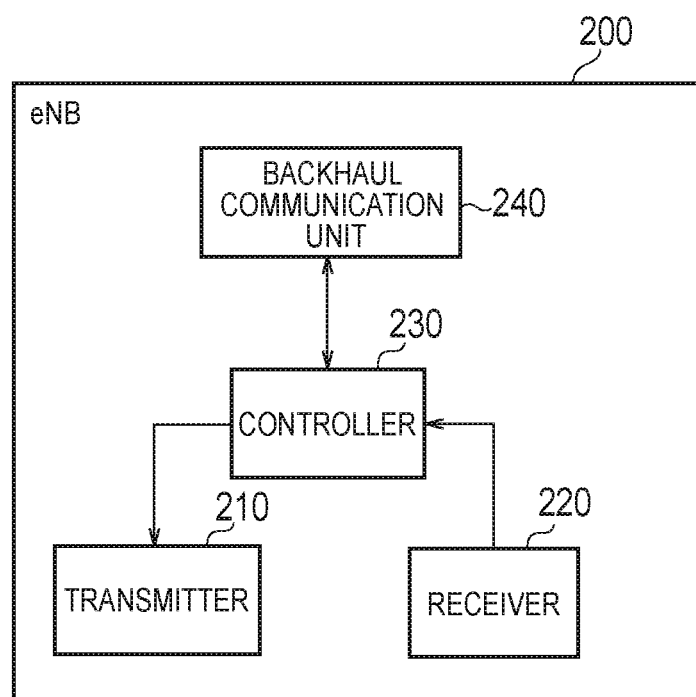
FIG. 4 is a diagram illustrating a configuration of an eNB (base station) according to the embodiment.

FIG. 4 is a diagram illustrating a configuration of an eNB (base station) according to the embodiment. As illustrated in FIG. 4, the eNB 200 includes a transmitter 210, a receiver 220, a controller 230, and a backhaul communication unit 240.

The transmitter 210 performs various transmissions under the control of the controller 230. The transmitting unit 210 includes antennas and a transmitting machine. The transmitting machine converts a baseband signal (transmission signal) outputted by the controller 230 into a radio signal. The transmitting machine transmits the radio signal from the antennas.

The receiver 220 performs various types of reception under the control of the controller 230. The receiver 220 includes antennas and a receiving machine. The receiving machine converts the radio signal received by the antennas into a baseband signal (received signal). The receiving machine outputs the baseband signal to the controller 230.

The controller 230 performs various controls in the eNB 200. The controller 230 includes a processor and a memory. The memory stores programs executed by the processor and information used for processing by the processor. The processor includes a baseband processor and a CPU. The baseband processor performs modulation and demodulation, encoding, decoding, and the like of the baseband signal. The CPU performs various processes by executing programs stored in the memory. The processor executes various processes to be described later.

The backhaul communication unit 240 is connected to the adjacent eNB via the X2 interface. The backhaul communication unit 240 is connected to the MME/S-GW 300 via the S1 interface. The backhaul communication unit 240 is used for communication performed on the X2 interface, communication performed on the S1 interface, and the like. The backhaul communication unit 240 can also be used for communication on the M1 interface and for communication on the M2 interface.

Figure 5:
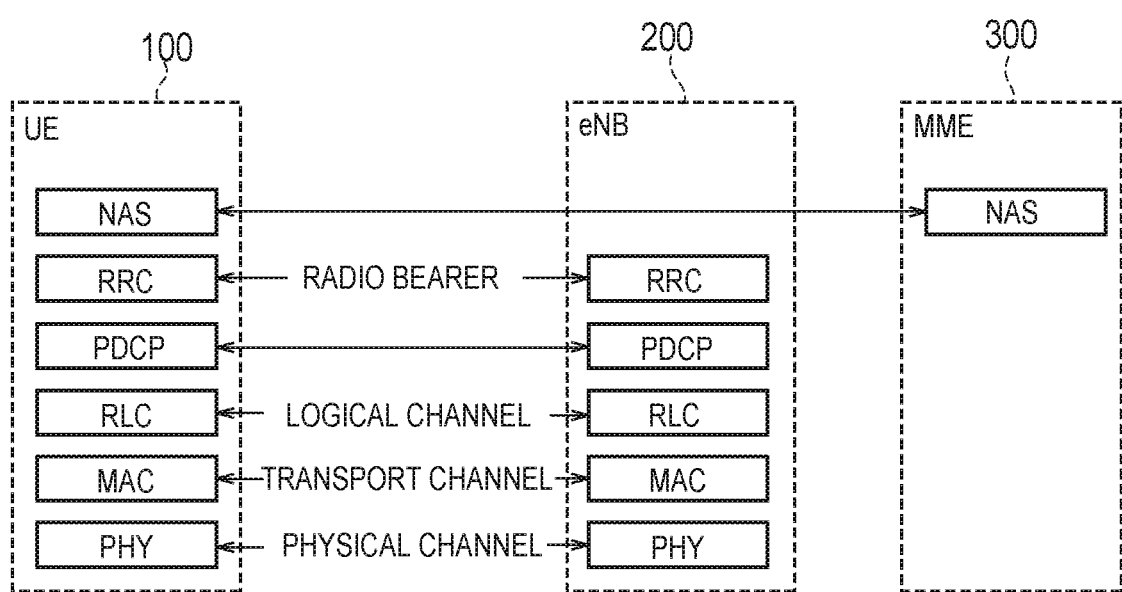
FIG. 5 is a diagram illustrating a protocol stack of a radio interface in the LTE system according to the embodiment.

FIG. 5 is a diagram illustrating a protocol stack of a radio interface in the LTE system. As illustrated in FIG. 5, the radio interface protocol is divided into the first layer to the third layer of the OSI reference model. The first layer is a physical (PHY) layer. The second layer includes a MAC (Medium Access Control) layer, an RLC (Radio Link Control) layer, and a PDCP (Packet Data Convergence Protocol) layer. The third layer includes an RRC (Radio Resource Control) layer.

The physical layer performs coding/decoding, modulation/demodulation, antenna mapping/demapping, resource mapping/demapping. Between the physical layer of the UE 100 and the physical layer of the eNB 200, data and control signals are transmitted via the physical channel.

The MAC layer performs priority control of data, retransmission processing by HARQ (Hybrid ARQ), and the like. Between the MAC layer of the UE 100 and the MAC layer of the eNB 200, data and control signals are transmitted via the transport channel. The MAC layer of the eNB 200 includes a scheduler. The scheduler determines the uplink and downlink transport format (Transport Block Size, Modulation and Coding Scheme (MCS)) and the allocated resource block to the UE 100.

The RLC layer uses the functions of the MAC layer and the physical layer to transmit data to the RLC layer on the receiving side. Between the RLC layer of the UE 100 and the RLC layer of the eNB 200, data and control signals are transmitted via logical channels.

The PDCP layer carries out header compression/decompression, encryption/decryption.

The RRC layer is defined only in the control plane handling the control signal. Messages (RRC messages) for various configurations are transmitted between the RRC layer of the UE 100 and the RRC layer of the eNB 200. The RRC layer controls logical channels, transport channels, and physical channels in response to establishment, reestablishment and release of radio bearers. If there is a connection (RRC connection) between the RRC of the UE 100 and the RRC of the eNB 200, the UE 100 is in the RRC connected state. If there is not a connection (RRC connection) between the RRC of the UE 100 and the RRC of the eNB 200 otherwise the UE 100 is in the RRC idle state.

The NAS (Non-Access Stratum) layer located above the RRC layer performs session management, mobility management, and the like.

Figure 6A:
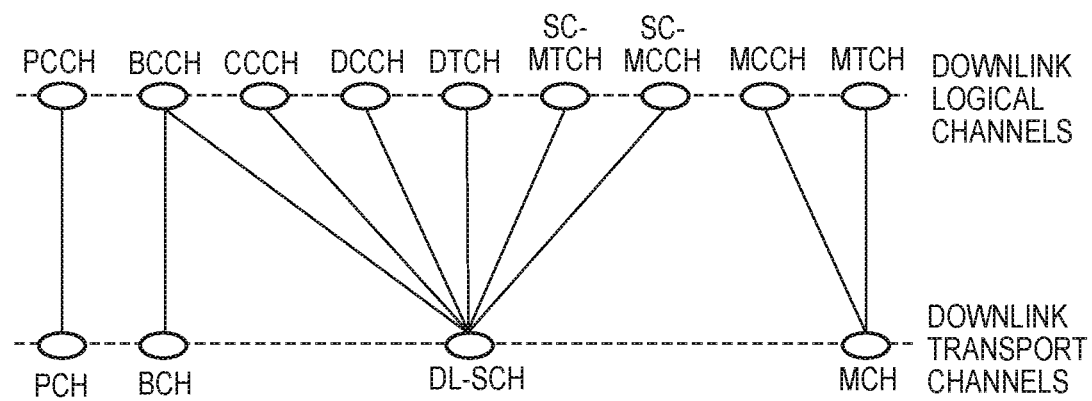
FIGS. 6A and 6B are diagrams illustrating a channel configuration of a downlink of the LTE system according to the embodiment.

FIG. 6 is a diagram illustrating a channel configuration of downlink of the LTE system. FIG. 6(a) illustrates mapping between a logical channel (Downlink Logical Channel) and a transport channel (Downlink Transport Channel).

As illustrated in FIG. 6(a), PCCH (Paging Control Channel) is a logical channel for notifying paging information and system information change. The PCCH is mapped to PCH (Paging Channel) that is a transport channel.

BCCH (Broadcast Control Channel) is a logical channel for system information. The BCCH is mapped to BCH (Broadcast Control Channel) and a DL-SCH (Downlink Shared Channel), both of which are transport channels.

CCCH (Common Control Channel) is a logical channel for transmission control information between the UE 100 and the eNB 200. The CCCH is used if the UE 100 does not have an RRC connection with the network. The CCCH is mapped to the DL-SCH.

DCCH (Dedicated Control Channel) is a logical channel for transmitting individual control information between the UE 100 and the network. The DCCH is used if the UE 100 has an RRC connection. The DCCH is mapped to the DL-SCH.

DTCH (Dedicated Traffic Channel) is an individual logical channel for data transmission. The DTCH is mapped to the DL-SCH.

SC-MTCH (Single Cell Multicast Traffic Channel) is a logical channel for SC-PTM transmission. The SC-MTCH is a point-to-multipoint downlink channel for transmitting data from the network to the UE 100 by using the SC-PTM transmission.

SC-MCCH (Single Cell Multicast Control Channel) is a logical channel for SC-PTM transmission. The SC-MCCH is a point-to-multipoint downlink channel for transmitting MBMS control information for one or more SC-MTCHs from the network to the UE 100. The SC-MCCH is used for a UE 100 that is to receive an MBMS using SC-PTM or that is interested in the reception. Further, there is only one SC-MCCH in one cell.

MCCH (Multicast Control Channel) is a logical channel for MBSFN transmission. The MCCH is used for transmitting MBMS control information for MTCH from the network to the UE 100. The MCCH is mapped to an MCH (Multicast Channel) that is a transport channel.

MTCH (Multicast Traffic Channel) is a logical channel for MBSFN transmission. The MTCH is mapped to the MCH.

Figure 6B:
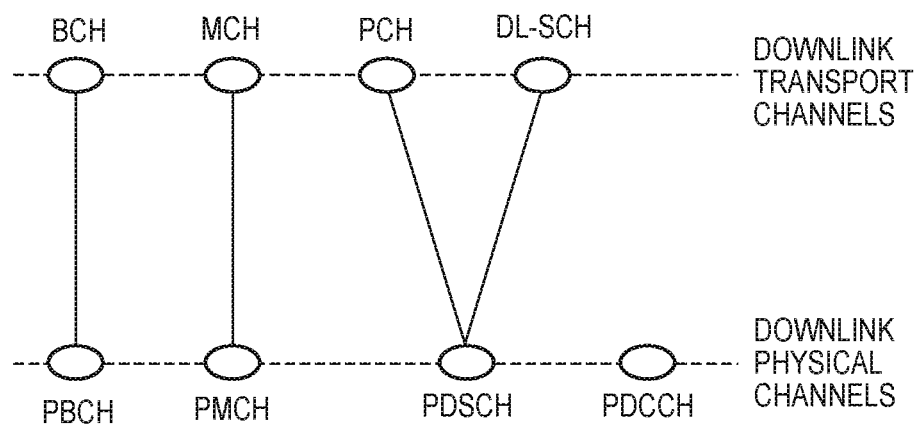

FIG. 6(b) illustrates mapping between a transport channel (Downlink Transport Channel) and a physical channel (Downlink Physical Channel).

As illustrated in FIG. 6(b), the BCH is mapped to PBCH (Physical Broadcast Channel).

The MCH is mapped to PMCH (Physical Multicast Channel). The MCH supports MBSFN transmission by a plurality of cells.

The PCH and the DL-SCH are mapped to PDSCH (Physical Downlink Shared Channel). The DL-SCH supports HARQ, link adaptation, and dynamic resource allocation.

PDCCH carries resource allocation information of the PDSCH (DL-SCH, PCH), HARQ information on the DL-SCH, and the like. Further, the PDCCH carries an uplink scheduling grant.

Figure 7:
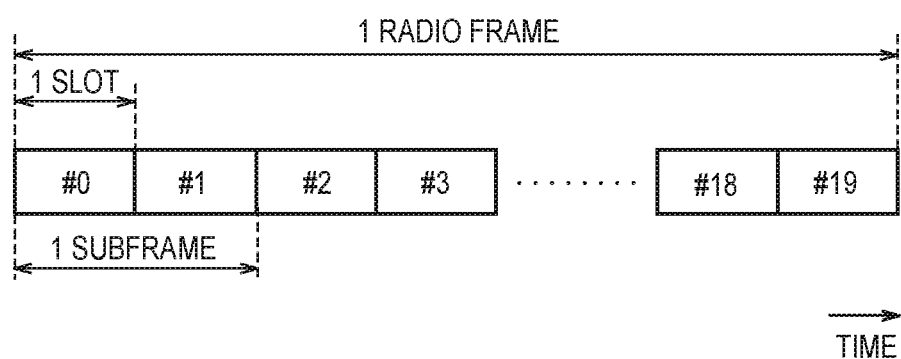
FIG. 7 is a diagram illustrating a configuration of a radio frame of the LTE system according to the embodiment.

FIG. 7 is a diagram illustrating a configuration of a radio frame of the LTE system. In the LTE system, OFDMA (Orthogonal Frequency Division Multiple Access) is applied to a downlink, and SC-FDMA (Single Carrier Frequency Division Multiple Access) is applied to an uplink, respectively.

As illustrated in FIG. 7, the radio frame includes ten subframes arranged in a time direction. Each of the subframes includes two slots arranged in the time direction. Each of the subframes has a length of 1 ms and each of the slots has a length of 0.5 ms. Each of the subframes includes a plurality of resource blocks (RBs) in a frequency direction, and a plurality of symbols in the time direction. Each of the resource blocks includes a plurality of subcarriers in the frequency direction. One resource element (RE) includes one symbol and one subcarrier. Further, of radio resources (time and frequency resources) to be allocated to a UE 100, the frequency resource can be identified by a resource block, and the time resource can be identified by a subframe (or a slot).

In the downlink, a section including several symbols at the head of each of the subframes is a region used as the PDCCH for mainly transmitting a downlink control signal. Furthermore, the remaining portion of each of the subframes is a region available as the PDSCH for mainly transmitting downlink data. Further, in the downlink, an MBSFN subframe that is a subframe for MBSFN transmission may be set.

In the uplink, both ends in the frequency direction of each subframe are regions used as the PUCCH for mainly transmitting a uplink control signal. The remaining portion of each subframe is a region available as the PUSCH for mainly transmitting uplink data.

[Outline of Cell Reselection Operation]

The UE 100 under RRC idle state measures, if a start condition is satisfied, the quality of an adjacent cell adjacent to the current serving cell, and selects, from among the cells that satisfy a selection condition, the target cell used as a serving cell.

Firstly, the start condition is shown as follows:

(A1) A Frequency Having a Higher Priority than the Priority of the Frequency of the Current Serving Cell the UE 100 always measures the quality of the frequency having the higher priority.

(A2) A Frequency Having a Priority Equal to or Lower than the Priority of the Frequency of the Current Serving Cell the UE 100 measures, if the quality of the current serving cell falls below a predetermined threshold value, the quality of the frequency having the equal priority or the lower priority.

Secondly, the selection condition is shown as follows:

(B1) The Priority of the Frequency of the Adjacent Cell is Higher than the Priority of the Current Serving Cell the UE 100 selects a cell that satisfies a relationship of Squal>ThreshX, HighQ over a predetermined period (TreselectionRAT), or a cell that satisfies a relationship of Srxlev>ThreshX, HighP over the predetermined period (TreselectionRAT). In such a case, such criteria to be satisfied by the adjacent cell may be referred to as "S-criteria".

It is noted that Squal represents a cell selection quality level. Squal is calculated by Squal=Qqualmeas−(Qqualmin+Qqualminoffset)−Qoffsettemp. Qqualmeas is a quality level (RSRQ) of the adjacent cell, Qqualmin is a minimum required quality level, Qqualminoffset is a predetermined offset regularly applied to the adjacent cell, and Qoffsettemp is an offset temporarily applied to the adjacent cell. ThreshX, HighQ is a predetermined threshold value.

Further, Srxlev represents a cell selection reception level. Srxlev is calculated by Srxlev=Qrxlevmeas−(Qrxlevmin+Qrxlevminoffset)−Pcompensation−Qoffsettemp. Qrxlevmeas is a reception level (RSRP) of the adjacent cell, Qrxlevmin is a minimum required reception level, Qrxlevminoffset is a predetermined offset regularly applied to the adjacent cell, Pcompensation is a parameter related to an uplink capability, and Qoffsettemp is an offset temporarily applied to the adjacent cell. ThreshX, HighP is a predetermined threshold value.

(B2) The Priority of the Frequency of the Adjacent Cell is the Same as the Priority of the Current Serving Cell the UE 100 calculates a ranking Rs of the current serving cell and a ranking Rn of the adjacent cell, and selects a cell having a higher ranking Rn than Rs over a predetermined period (TreselectionRAT) as the target cell. In such a case, such criteria to be satisfied by the adjacent cell maybe referred to as "R-criteria".

It is noted that Rs is calculated by Rs=Qmeas,s+QHyst−Qoffsettemp. Rn is calculated by Rn=Qmeas,n−Qoffset−Qoffsettemp. Qmeas,s is the reception level (RSRP) of the current serving cell, and Qmeas,n is the reception level (RSRP) of the adjacent cell. QHyst is a hysteresis value for achieving preferential reselection of the current serving cell as the target cell. Qoffsettemp is an offset temporarily applied to the current serving cell and the adjacent cell.

(B3) The Priority of the Frequency of the Adjacent Cell is Lower than the Priority of the Current Serving Cell the UE 100 selects, under a premise that Squal<ThreshServing, LowQ is satisfied over a predetermined period (TreselectionRAT), or Srxlev<ThreshServing, LowP is satisfied over the predetermined period (TreselectionRAT), the target cell from among the adjacent cells by a method similar to the above described (B1).

It is noted that ThreshServing, LowQ and ThreshServing, LowP are predetermined threshold values similarly to ThreshX, HighQ and ThreshX, HighP.

It is noted that various types of parameters used for selecting the target cell are included in system information (SIB; System Information Block) broadcast from the eNB 200. The various types of parameters include the priority of the frequency (cellReselectionPriority), a predetermined period (TreselectionRAT), various types of offsets (Qqualminoffset, Qrxlevminoffset, Qoffsettemp, QHyst, Qoffset), and various types of threshold values (ThreshX, HighQ, ThreshX, HighP, ThreshServing, LowQ, ThreshServing, LowP).

(Outline of SC-PTM)

Radio transmission schemes for MBMS include two schemes: MBSFN transmission and SC-PTM transmission. In the MBSFN transmission, data is transmitted via the PMCH for each MBSFN area including a plurality of cells. In contrast, in the SC-PTM transmission, data is transmitted via the PDSCH for each cell. In the following, a scenario in which the UE 100 performs SC-PTM reception is mainly assumed. However, MBSFN may be assumed.

The UE 100 may receive the MBMS service in the RRC connected state or may receive the MBMS service in the RRC idle state. In the following, it is mainly assumed that the UE 100 receives the MBMS service in the RRC idle state.

Figure 8:
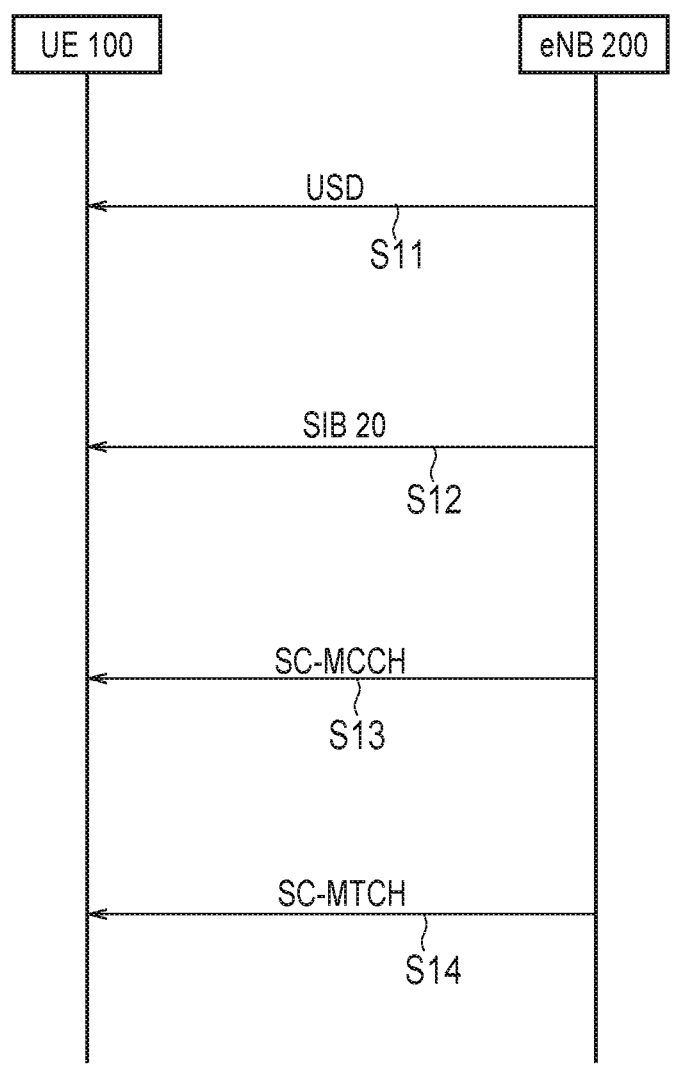
FIG. 8 is a diagram illustrating an operation example of SC-PTM according to the embodiment.

FIG. 8 is a diagram illustrating an operation example of SC-PTM.

As illustrated in FIG. 8, in step S11, the UE 100 acquires a USD (User Service Description) from the EPC 20 via the eNB 200. The USD provides basic information on each MBMS service. For each MBMS service, the USD includes a TMGI for identifying the MBMS service, a frequency at which the MBMS service is provided, and a provision start/end time of the MBMS service.

In step S12, the UE 100 receives a SIB 20 from the eNB 200 via the BCCH. The SIB 20 includes information (scheduling information) necessary for acquiring the SC-MCCH. FIG. 9 is a diagram illustrating the SIB 20. As illustrated in FIG. 9, the SIB 20 includes sc-mcch-ModificationPeriod representing a cycle in which the content of the SC-MCCH can be changed, sc-mcch-RepetitionPeriod representing a transmission (retransmission) time interval of the SC-MCCH in the number of radio frames, sc-mcch-Offset representing a scheduled radio frame offset of the SC-MCCH, sc-mcch-Subframe representing a subframe in which the SC-MCCH is scheduled, and so forth.

In step S13, the UE 100 receives SCPTM configuration information (SCPTM Configuration) from the eNB 200 via the SC-MCCH, based on the SIB 20. For the SC-MCCH transmission in the physical layer, an SC-RNTI (Single Cell RNTI) is used. FIG. 10 is a diagram illustrating the SCPTM configuration information (SCPTM Configuration) in the SC-MCCH. As illustrated in FIG. 10, the SCPTM configuration information includes control information applicable to the MBMS service, which is transmitted via SC-MRB (Single Cell MBMS Point to Multipoint Radio Bearer). The SCPTM configuration information includes sc-mtch-InfoList containing configuration for each SC-MTCH in the cell transmitting that information, and scptmNeighbourCellList being a list of neighbour cells providing the MBMS service via the SC-MRB. The sc-mtch-InfoList contains one or more pieces of SC-MTCH-Info. Each piece of the SC-MTCH-Info contains information on an ongoing MBMS session (mbmsSessionInfo) to be transmitted via the SC-MRB, a G-RNTI (Group RNTI) corresponding to the MBMS session, and sc-mtch-schedulingInfo being DRX information for the SC-MTCH. The mbmsSessionInfo contains a TMGI and a session ID (sessionId) to identify the MBMS service. The G-RNTI is an RNTI to identify a multicast group (specifically, SC-MTCH addressed to a specific group). The G-RNTI is mapped to the TMGI on a one-to-one basis. The sc-mtch-schedulingInfo contains onDurationTimerSCPTM, drx-InactivityTimerSCPTM, and schedulingPeriodStartOffsetSCPTM. The schedulingPeriodStartOffsetSCPTM contains SC-MTCH-SchedulingCycle and SC-MTCH-SchedulingOffset.

In step S14, the UE 100 receives the MBMS service (multicast data) corresponding to the TMGI, in which the UE 100 itself is interested, via the SC-MTCH, based on SC-MTCH-SchedulingInfo in the SCPTM configuration information (SCPTM Configuration). In the physical layer, the eNB 200, after transmitting the PDCCH by using the G-RNTI, transmits the multicast data via the PDSCH.

It should be noted that the control signal (signaling) described with reference to FIG. 10 is an example. Due to optimization for power saving reception or the like, part of the control signals may be omitted or the order of the control signals may be changed.

(Outline of eMTC and NB-IoT)

In the embodiment, a scenario where a UE 100 in a new category exists is assumed. The UE 100 in the new category is a UE 100 whose transmission and reception bandwidth is limited only to a part of the system transmission and reception band. The new UE category is referred to as, for example, category M1 and NB (Narrow Band)-IoT category. Here, the category M1 is an eMTC (enhanced Machine Type Communications) UE. The NB-IoT UE is category NB1. The category M1 limits the transmission and reception bandwidth of the UE 100 to 1.08 MHz (that is, the bandwidth of six resource blocks) and supports an enhanced coverage (CE) technique using repetition and the like. The NB-IoT category further limits the transmission and reception bandwidth of the UE 100 to 180 kHz (that is, the bandwidth of one resource block) and supports the coverage enhancement technique. Repetition is a technique of repeatedly transmitting the same signal using a plurality of subframes. As an example, the system bandwidth of the LTE system is 10 MHz, of which the transmission and reception bandwidth is 9 MHz (that is, the bandwidth of 50 resource blocks). On the other hand, the UE 100 in the M1 category cannot receive normal PDCCH because it cannot receive a downlink radio signal transmitted with a wider bandwidth than six resource blocks. For this reason, MPDCCH (MTC-PDCCH) being PDCCH for MTC is introduced. For the same reason, NPDCCH (NB-PDCCH) being PDCCH for NB-IoT is introduced.

Figure 11:
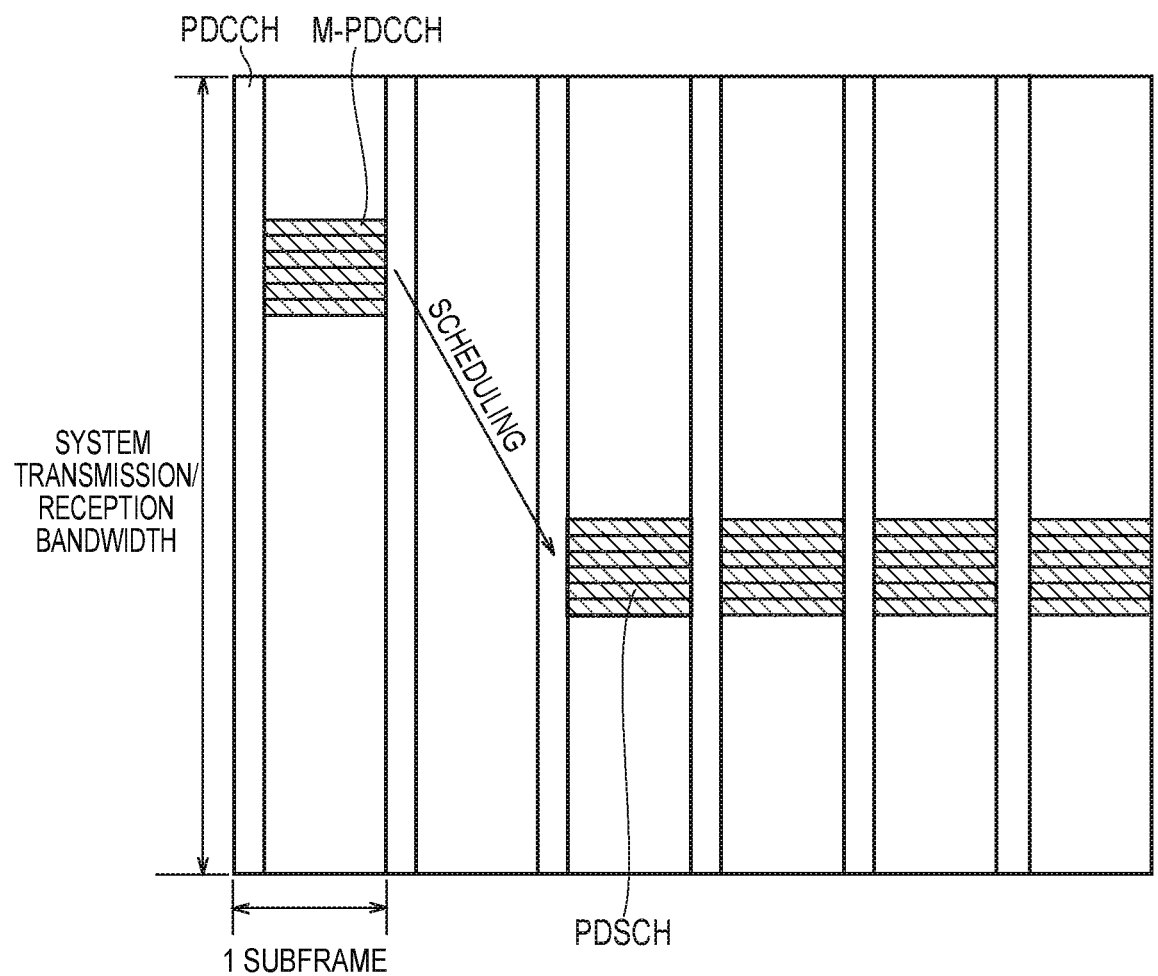
FIG. 11 is a diagram illustrating a downlink physical channel for an eMTC UE according to the embodiment.

FIG. 11 is a diagram illustrating a downlink physical channel for the eMTC UE. As illustrated in FIG. 11, the eNB 200 transmits MPDCCH within six resource blocks. The MPDCCH includes scheduling information for allocating PDSCH. As an example, the MPDCCH allocates PDSCH of a subframe different from the subframe in which the MPDCCH is transmitted. The eNB 200 transmits the PDSCH within six resource blocks. Further, the eNB 200 allocates PDSCHs to a plurality of subframes in order to perform repetition of the same signal. The UE 100 in category M1 identifies the allocated PDSCH by receiving the MPDCCH and receives data transmitted with the allocated PDSCH.

Figure 12:
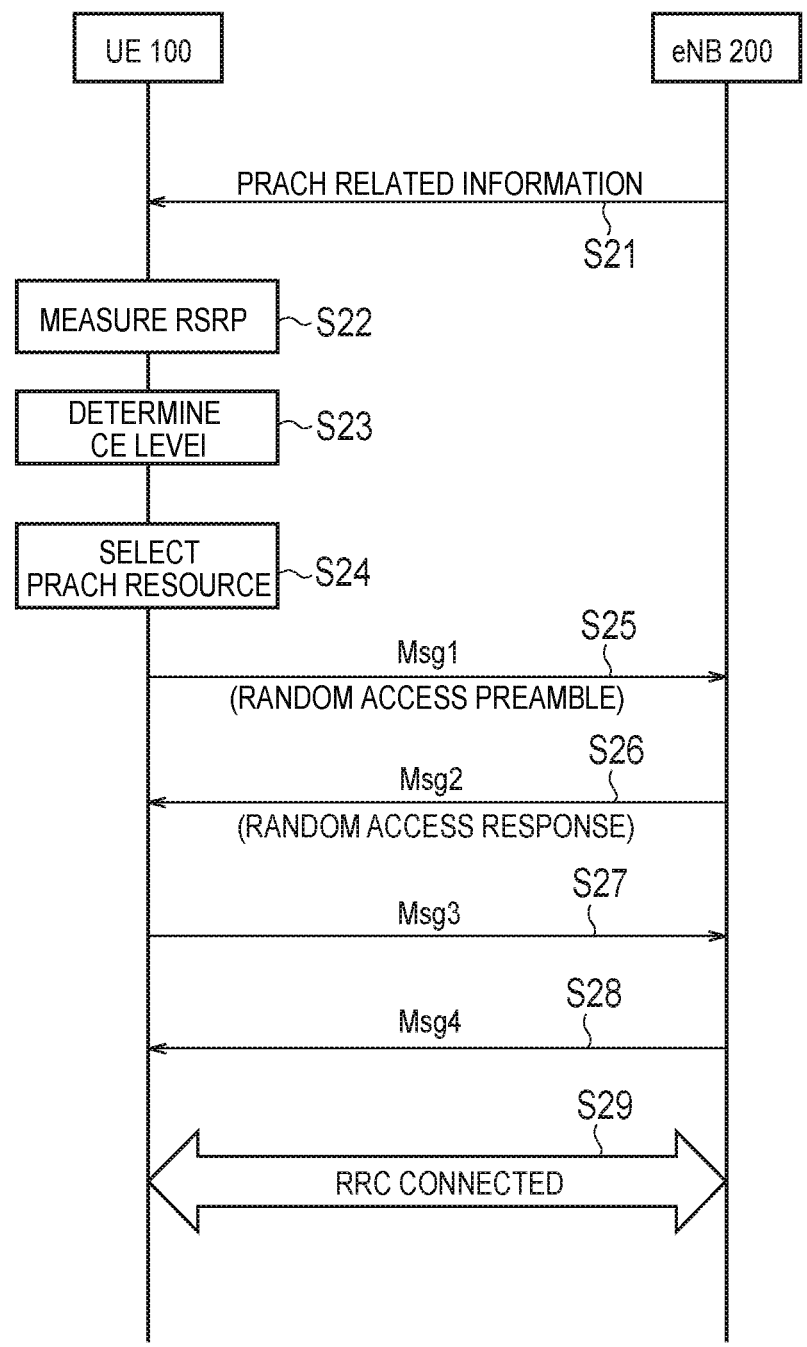
FIG. 12 is a flowchart illustrating a random access procedure for an eMTC UE and an NB-IoT UE according to the embodiment.

FIG. 12 is a flowchart illustrating a random access procedure for an eMTC UE and an NB-IoT UE. In an initial state of FIG. 12, the UE 100 is in the RRC idle state. The UE 100 performs a random access procedure for transiting to the RRC connected state.

The UE 100 selects a cell of the eNB 200 as a serving cell. The UE 100 may, if a first cell selection criteria for normal coverage (first S-criteria) is not satisfied, and a second cell selection criteria for enhanced coverage (second S-criteria) is satisfied, determine that the UE 100 is in an enhanced coverage. A "UE in an enhanced coverage" means a UE that is required to use the coverage enhancement technique (the enhanced coverage mode) to access a cell. It is noted that it is mandatory for the eMTC UE to use the enhanced coverage mode.

As illustrated in FIG. 12, in step S21, the eNB 200 transmits PRACH (Physical Random Access Channel) related information by broadcast signaling (for example, SIB). The PRACH related information includes various parameters provided for each enhanced coverage level (the CE level). The CE level may be referred to as the "enhanced coverage level". As an example, a total of four levels of the CE level, CE levels 0 to 3 are defined. The various parameters include an RSRP (Reference Signal Received Power) threshold value, a PRACH resource, and the maximum preamble transmission number.

The PRACH resource includes a radio resource (a time-frequency resource) and a signal sequence (a preamble sequence). The UE 100 stores the received PRACH related information.

In step S22, the UE 100 measures the RSRP based on a reference signal transmitted from the eNB 200.

In step S23, the UE 100 determines the CE level of the UE 100 by comparing the measured RSRP with the RSRP threshold value for each CE level. The CE level indicates the degree of enhanced coverage required for the UE 100. The CE level is related at least to the number of transmissions in repetition (that is, repetition count).

In step S24, the UE 100 selects a PRACH resource corresponding to the CE level of the UE 100.

In step S25, the UE 100 transmits an Msg 1 (random access preamble) to the eNB 200 using the selected PRACH resource. The eNB 200 identifies the CE level of the UE 100 based on the PRACH resource used for the received Msg 1.

In step S26, the eNB 200 transmits, to the UE 100, an Msg 2 (random access response) including scheduling information indicating the PUSCH resource allocated to the UE 100. It is noted that until the UE 100 properly receives the Msg 2, the UE 100 can transmit the Msg 1 a plurality of times up to the maximum preamble transmission number corresponding to the CE level of the UE 100.

In step S27, the UE 100 transmits an Msg 3 to the eNB 200 based on the scheduling information. The Msg 3 may be an RRC Connection Request message.

In step S28, the eNB 200 transmits an Msg 4 to the UE 100.

In step S29, the UE 100 transits to an RRC connected state in response to the reception of the Msg 4. Thereafter, the eNB 200 controls the repetition to the UE 100 based on the identified CE level.

First Embodiment

A first embodiment will be described below. In the first embodiment, a scenario is assumed in which batch distribution of a firmware or the like is performed to the UE 100 in the aforementioned new category by multicast/broadcast using MBMS. Also, a case where the UE 100 in the RRC idle state receives an MBMS service distributed by the SC-PTM is mainly assumed.

The UE 100 according to the first embodiment includes a receiver 110 configured to receive the MBMS service distributed from the eNB 200 by using a coverage enhancement technique including the repetition, a controller 130 configured to determine whether or not a predetermined event occurs, and a transmitter 120 configured to transmit a notification indicating the CE level required by the UE 100

(hereinafter referred to as "CE level notification") to the eNB 200 in response to the occurrence of the predetermined event. The predetermined event includes transmission of the CE level notification being requested from the eNB 200 or normal reception of the MBMS service not being possible.

The CE level notification may be the aforementioned Msg 1 (Random Access Preamble) or a message different from the Msg 1. However, in a method for using the Msg 1, there are many signaling accompanying the CE level notification and the UE 100 may unnecessarily shift to an RRC connected state. If the Msg 1 is used, information for not shifting the UE 100 to the RRC connected state may be included into the Msg 1 or the Msg 3. Alternatively, a sequence (signal sequence) indicating that the message is the CE level notification may be used, or a resource (time-frequency resource) for the CE level notification may be used for transmission. In this case, the UE 100 and the eNB 200 may end the random access procedure prematurely without establishing the RRC connection.

The CE level notification may include information directly indicating a value of the CE level determined by the UE 100. Alternatively, the CE level notification may include information indirectly indicating the value of the CE level determined by the UE 100. Such information may be a repetition count corresponding to the CE level or the RSRP measured by the UE 100. Further, the CE level notification may include a service identifier (TMGI) of one or more MBMS services that the UE 100 is receiving or in which the UE 100 is interested in receiving.

In an operation pattern 1 of the first embodiment, the receiver 110 of the UE 100 receives from the eNB 200 a notification request for requesting transmission of the CE level notification before starting receiving the MBMS service. In response to reception of the notification request, the transmitter 120 of the UE 100 transmits the CE level notification to the eNB 200. That is, the operation pattern 1 is a pattern in which the UE 100 notifies the CE level according to the request from the eNB 200. As a result, the eNB 200 can apply the appropriate repetition count and/or MCS to the MBMS distribution, based on the CE level of the UE 100.

In an operation pattern 2 of the first embodiment, the controller 130 of the UE 100 determines whether or not the MBMS service can be normally received after starting receiving the MBMS service. The transmitter 120 of the UE 100 transmits the CE level notification to the eNB 200 in response to the determination that it is not possible to normally receive the MBMS service. That is, the operation pattern 2 is a pattern in which the UE 100 autonomously determines a notification timing of the CE level. As a result, the eNB 200 can appropriately change the repetition count and/or the MCS applied to the MBMS distribution, based on the CE level of the UE 100.

The eNB 200 may transmit to the UE 100 trigger designation information for designating whether or not the operation pattern 1 or the operation pattern 2 is to be applied. The UE 100 controls the transmission of the CE level notification according to the designated operation pattern.

In the first embodiment, the receiver 110 of the UE 100 may receive from the eNB 200 setting information indicating a common resource shared by a plurality of UEs 100 to transmit the CE level notification. The transmitter 120 of the UE 100 may transmit the CE level notification to the eNB 200 by using the common resource. By using such a common resource, it is not necessary any more for the eNB 200 to individually allocate the resource to the UE 100, so even the UE 100 in the RRC idle state can transmit the CE level notification to the eNB 200.

In the first embodiment, the controller 130 of the UE 100 may prohibit transmission of the next CE level notification until a predetermined time period has elapsed since the CE level notification has been transmitted. The controller 130 of the UE 100 may enable transmission of the next CE level notification after a predetermined time interval has elapsed since the CE level notification has been transmitted. The predetermined time period may be set from the eNB 200 to the UE 100 in the setting information, for example. As a result, it is possible to prevent the same UE 100 from continuously transmitting the CE level notification.

In the first embodiment, the controller 130 of the UE 100 may prohibit transmission of the CE level notification in response to a reception state (for example, RSRP) being better than a threshold value. The controller 130 of the UE 100 may enable the transmission of the CE level notification in response to the reception state being poor than the threshold value. The eNB 200 may set a threshold value to the UE 100 by broadcast signaling (for example, an SIB). The threshold value may be a threshold value included in the second cell selection criteria for enhanced coverage or may be another threshold value. In other words, transmission of the CE level notification may be enabled only for the UE 100 present in the enhanced coverage, or the transmission of the CE level notification may be enabled for the UE 100 having a predetermined CE level or less.

Figure 13:
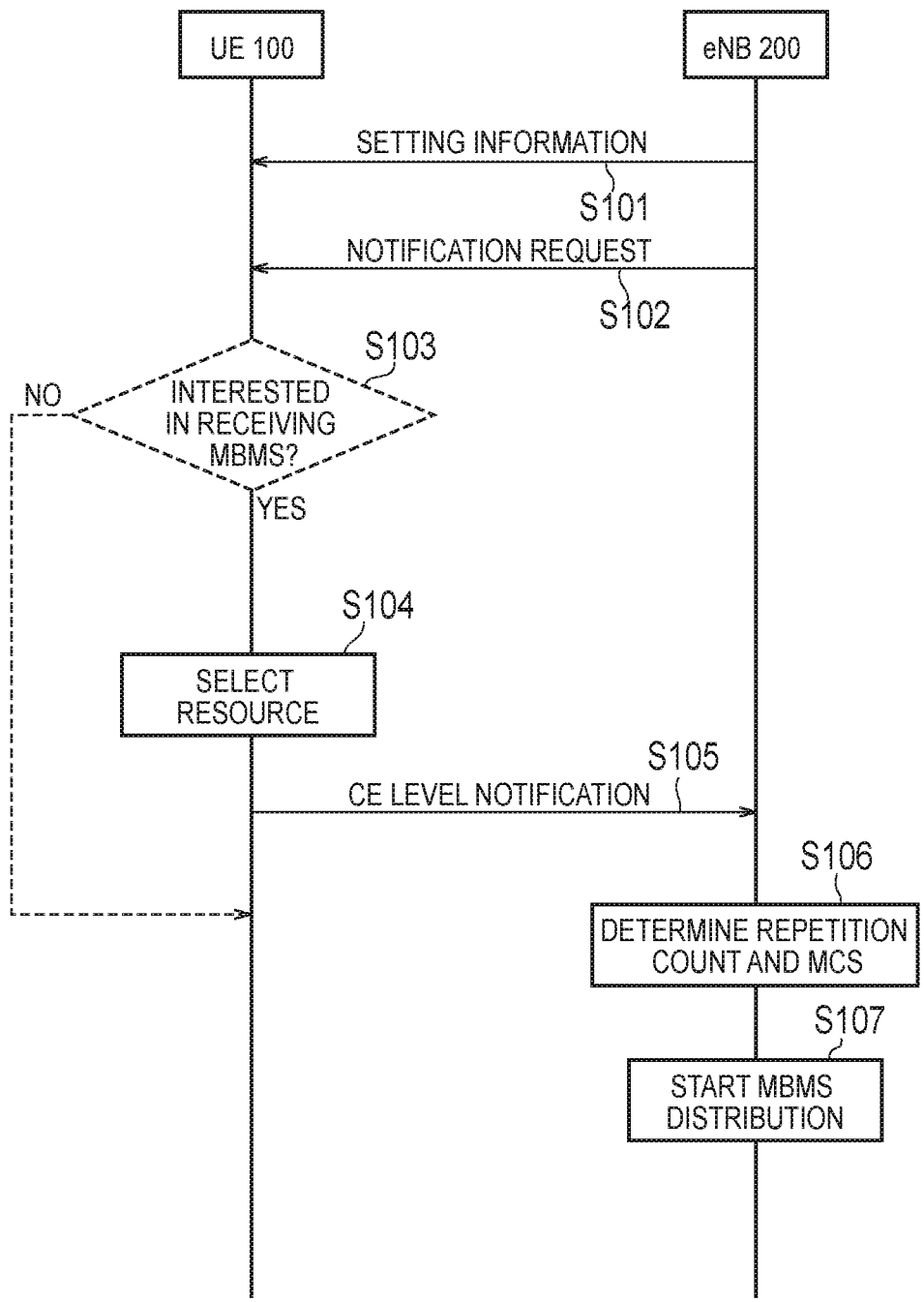
FIG. 13 is a flowchart illustrating an example of an operation pattern 1 according to an first embodiment.

FIG. 13 is a flowchart illustrating an example of the operation pattern 1 according to the first embodiment. The UE 100 is in the RRC idle state. Further, the UE 100 is a UE present in the enhanced coverage, that is, a UE requiring use of the coverage enhancement technique (enhanced coverage mode).

As illustrated in FIG. 13, in step S101, the eNB 200 transmits the setting information indicating the common resource to be commonly used, by a plurality of UEs 100, for transmitting the CE level notification. The setting information is transmitted by broadcasting or multicasting. For example, the eNB 200 (transmitter 210) transmits the setting information by using an SIB, the SC-MCCH, or the MCCH. The setting information includes a parameter indicating a common resource (a time resource, a frequency resource, and/or a signal sequence). The common resource be reserved for each CE level. The setting information may further include a power control parameter for controlling the transmission power of the CE level notification. The time resource parameter may include information indicating a system frame number (SFN), information indicating a subframe (bitmap), and the like. The frequency resource parameter may include information indicating a start point or an end point of a resource block, information indicating a range (the number of resource blocks) of consecutive resource blocks, and the like. The setting information may include a period (or a start time/an end time) for providing the common resource. The period may be defined as a second, and may be defined as a frame number (SFN, a subframe, and the like). The period may be a previously determined value (for example, 10 subframe periods). If there is the period, the UE 100 transmits the CE level notification within the period. In other words, the UE 100 does not transmit the CE level notification after lapse of the period.

In step S102, the eNB 200 transmits a notification request for requesting the transmission of the CE level notification. The notification request is transmitted by broadcasting or multicasting. For example, the eNB 200 (transmitter 210) transmits the notification request by using the system information block (SIB), the SC-MCCH, or the MCCH. The notification request may include a service identifier (TMGI) of one or more MBMS services for which the CE level notification is to be transmitted. The notification request may include information indicating that the UE 100 in the RRC idle state is a recipient of the notification request.

It is noted that step S102 may be performed before step S101. Alternatively, step S102 may be performed simultaneously of step S101. In this case, the notification request and the setting information may be included in one message.

The UE 100 receives the notification request and the setting information.

In step S103, in response to reception of the notification request, the UE 100 may determine whether or not the UE 100 is interested in receiving the MBMS service. As an example, if the UE 100 is set from an upper layer to start receiving the MBMS service, the UE 100 determines that the UE 100 is interested in receiving the MBMS service. If the UE 100 is not interested in receiving the MBMS service, the UE 100 need not transmit the CE level notification to the eNB 200. Here, description proceeds with an assumption that the UE 100 is interested in receiving the MBMS service. Further, if the MBMS service for which the CE level notification is to be transmitted is designated, the UE 100 may determine whether or not the designated MBMS service matches the MBMS service in which the UE 100 is interested. If the designated MBMS service and the MBMS service in which the UE 100 is interested do not match, the UE 100 need not transmit the CE level notification to the eNB 200.

In step S104, the UE 100 selects the resource (the time resource, the frequency resource, and/or the signal sequence) included in the common resource, based on the setting information. The UE 100 may select the resource corresponding to the CE level of the UE 100 from the common resource.

In step S105, the UE 100 transmits the CE level notification to the eNB 200 by using the selected resource. The CE level notification may include information (TMGI) indicating the CE level of the UE 100 and/or information indicating the MBMS service that the UE 100 is interested in receiving. Here, even if the UE 100 is in the RRC idle state, the UE 100 can transmit the CE level notification to the eNB 200 by using the common resource.

The eNB 200 receives the CE level notification. It is noted that if a resource collision occurs among a plurality of UEs 100, the eNB 200 may fail to decode the CE level notification transmitted by using the resource. On the other hand, if no resource collision occurs, the eNB 200 successfully decodes the CE level notification. Based on the CE level notification, the eNB 200 grasps the CE level of each UE 100 interested in receiving the MBMS service. The eNB 200 may transfer the CE level notification received from the UE 100 to the MME 300 and/or the MCE 11 or the like.

In step S106, the eNB 200 decides the repetition count and/or the MCS applied to the MBMS service distributed by the SC-PTM, based on the grasped CE level.

In step S107, the eNB 200 distributes the MBMS service by the SC-PTM by using the decided repetition count and/or MCS.

Figure 14:
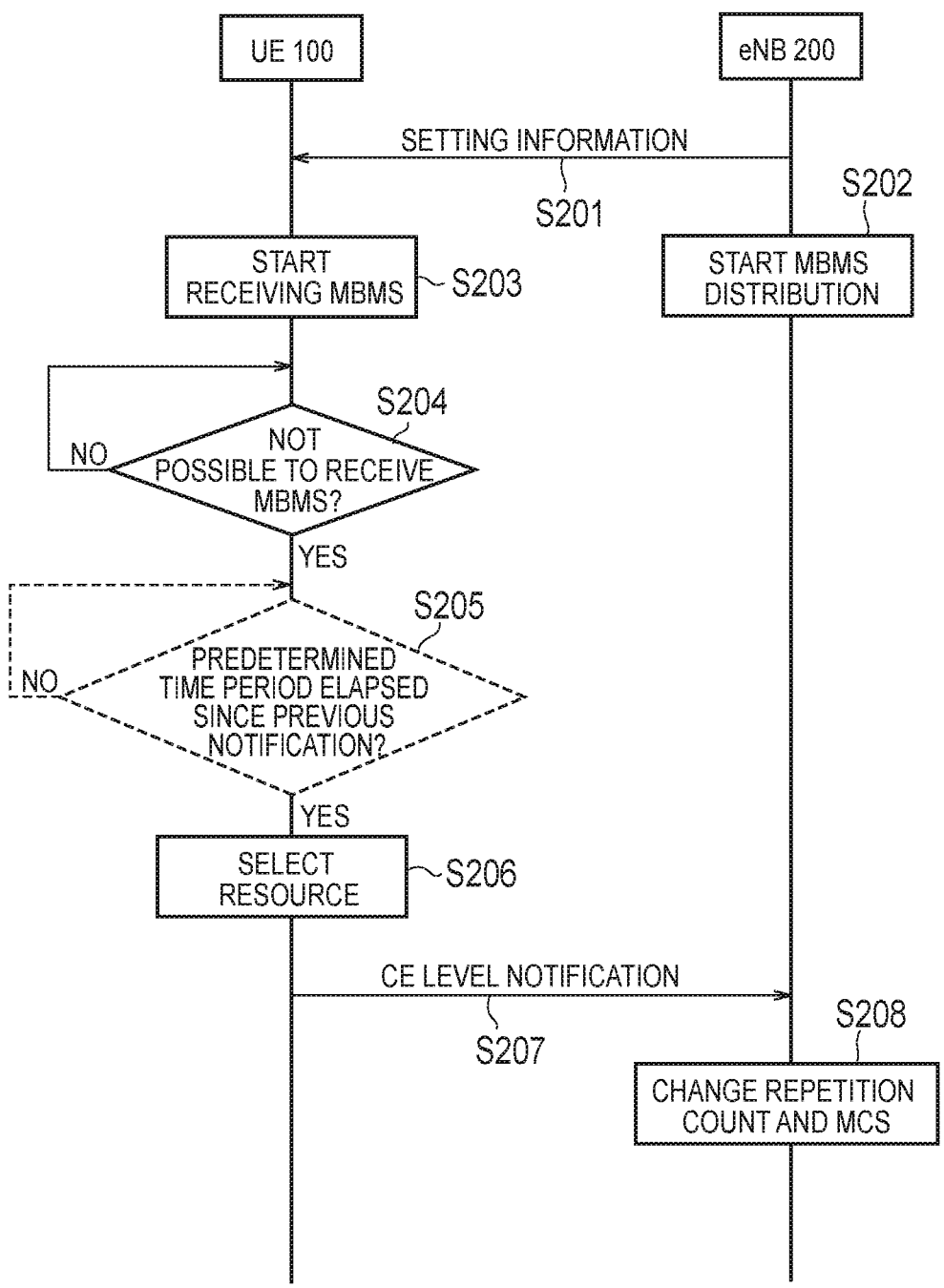
FIG. 14 is a flowchart illustrating an example of an operation pattern 2 according to the first embodiment.

FIG. 14 is a flowchart illustrating an example of the operation pattern 2 according to the first embodiment. Here, a difference from the operation pattern 1 will be mainly described and a redundant description will be omitted. The UE 100 is in the RRC idle state and present in the enhanced coverage.

As illustrated in FIG. 14, in step S201, the eNB 200 transmits setting information indicating the common resource to be commonly used, by a plurality of UEs 100, for transmitting the CE level notification.

In step S202, the eNB 200 distributes the MBMS service by the SC-PTM by using a predetermined repetition count and/or a predetermined MCS. To enable even a UE in a very poor reception state to receive the MBMS service, the predetermined repetition count and/or the predetermined MCS may be, for example, a maximum repetition count and/or a minimum MCS. The minimum MCS is an MCS with the lowest data rate and the highest error resilience.

In step S203, the UE 100 starts receiving the MBMS service distributed by the SC-PTM. Here, "starts receiving the MBMS service" means starting receiving control information and/or data for the MBMS service (SC-PTM). Therefore, in addition to the starting receiving the SC-MTCH, starting receiving the SC-MCCH may also be included, or starting receiving the SIB 20 may also be included.

In step S204, the UE 100 determines whether or not the UE 100 can normally receive the MBMS service in which the UE 100 is interested. As an example, the UE 100 determines that the UE 100 cannot normally receive the MBMS service upon failing in decoding the SC-MTCH carrying the data belonging to the MBMS service in which the UE 100 is interested. Alternatively, the UE 100 may determine that the UE 100 cannot normally receive the MBMS service upon an index value (for example, the RSRP and the error rate) of the reception state falling below a threshold value.

As another example, the UE 100 may predict whether or not to successfully decode the SC-MTCH carrying data belonging to the MBMS service in which the UE 100 is interested. The eNB 200 may provide information used for the prediction to the UE 100. The eNB 200 may transmit, as the information used for the prediction, information indicating the repetition count of an initial transmission of the SC-MTCH (data) and/or information indicating the MCS, in the SC-MCCH (SC-PTM setting information). Alternatively, the information used for the prediction may be a minimum repetition count of the SC-MTCH and/or the SC-MCCH. That is, the eNB 200 notifies that in the SC-PTM transmission (or an MBMS session), each packet is repeatedly transmitted at least for the minimum repetition count. According to the notification information, the UE 100 can determine whether or not the SC-PTM transmission can be received according to the level of the enhanced coverage. Alternatively, the information used for the prediction may be a maximum repetition count of the SC-MTCH and/or the SC-MCCH. Based on the information, the UE 100 can determine whether or not it is possible to expect to receive the SC-PTM transmission.

As another example, the UE 100 may predict whether or not to successfully decode the SC-MCCH carrying control information belonging to the MBMS service in which the UE 100 is interested. If a plurality of SC-MCCHs different in repetition count and/or MCS are provided, the eNB 200 transmits to the UE 100 information on a corresponding relationship between the SC-MCCH and the MBMS service (TMGI), in the SIB 20. Based on the SIB 20, the UE 100 identifies the repetition count and/or the MCS of the SC-MCCH carrying the control information belonging to the MBMS service in which the UE 100 is interested to predict whether or not to successfully decode the SC-MCCH.

If it is determined that it is not possible to normally receive the MBMS service in which the UE 100 is interested (step S204: YES), the UE 100 performs an operation to transmit the CE level notification.

In step S205, the UE 100 may determine whether or not a predetermined time period has elapsed since the previous CE level notification is transmitted. As an example, the UE 100 starts a timer set from the eNB 200 at the time of transmitting the CE level notification or at the time of determining the transmission of the CE level notification. During the operation of the timer, the UE 100 prohibits (disables) the transmission of the CE level notification. The UE 100 enables the transmission of the CE level notification after expiration of the timer.

In step S206, the UE 100 selects the resource (the time resource, the frequency resource, and/or the signal sequence) included in the common resource, based on the setting information. The UE 100 may select the resource corresponding to the CE level of the UE 100 from the common resource.

In step S207, the UE 100 transmits the CE level notification to the eNB 200 by using the selected resource. The CE level notification may be similar in content to the operation pattern 1. In the operation pattern 2, the CE level notification may include information indicating that the MBMS service cannot be received, or may include NACK.

The eNB 200 receives the CE level notification. Based on the CE level notification, the eNB 200 grasps the CE level of each UE 100 interested in receiving the MBMS service. The eNB 200 may transfer the CE level notification received from the UE 100 to the MME 300 and/or the MCE 11 or the like.

In step S208, the eNB 200 changes the repetition count and/or the MCS applied to the MBMS service distributed by the SC-PTM, based on the grasped CE level. The eNB 200 distributes the MBMS service by the SC-PTM by using the changed repetition count and/or MCS.

It is noted that if it is determined in step S204 that the MBMS reception is not possible, a predetermined layer (for example, RRC layer) of the UE 100 may notify an upper layer (for example, NAS layer) of the UE 100 of not being able to receive the MBMS. At that time, the predetermined layer may notify the upper layer of information (for example, TMGI information) of the MBMS service that cannot be received. Alternatively, if it is determined in step S204 that the MBMS reception is not possible, the UE 100 may attempt to shift to the RRC connected state to receive the MBMS service by unicast. Specifically, the UE 100 may transmit an RRC Connection Request message to the eNB 200. The transmission of the RRC Connection Request message may be implemented according to an instruction from the upper layer. It is noted that in this case, the CE level notification after step S205 need not be performed. Alternatively, the UE 100 may perform this operation if there is no information on the CE level notification in the setting information of step S201.

Figure 15:
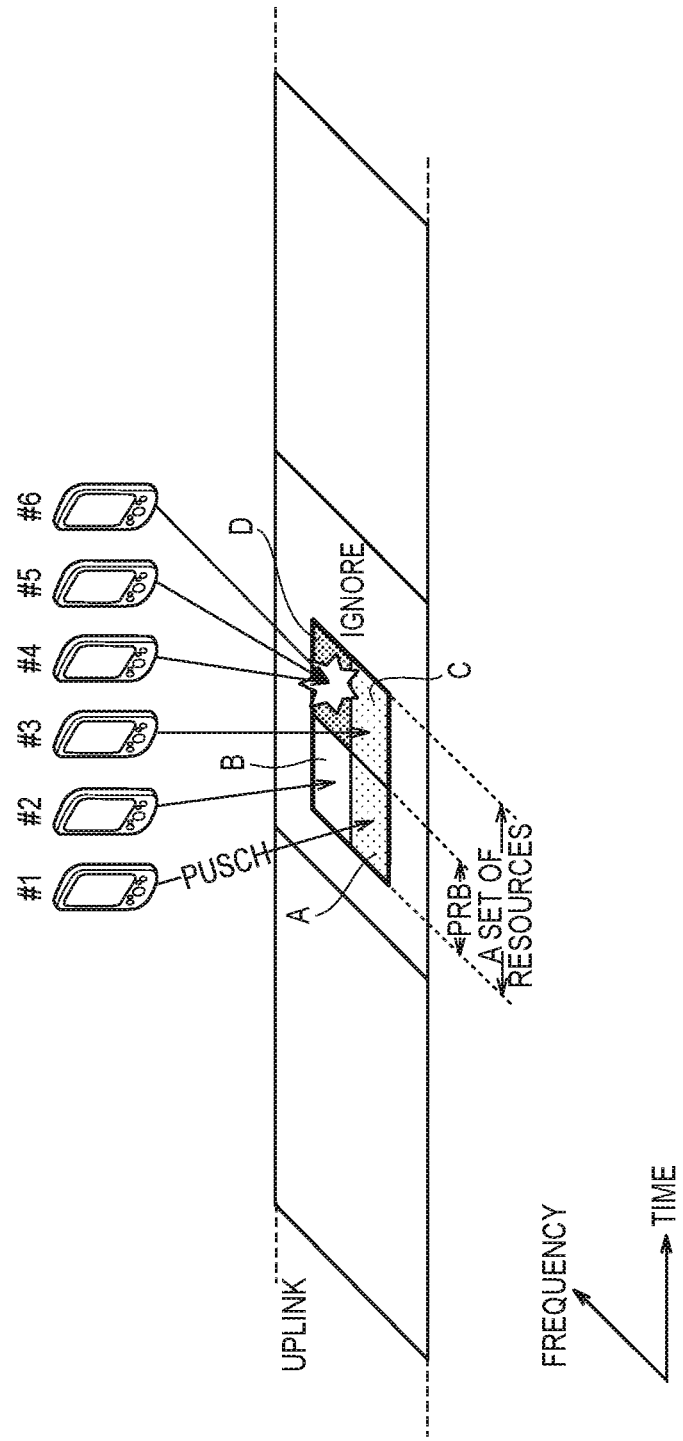
FIG. 15 is a diagram illustrating a first example of a common resource according to the first embodiment.

FIG. 15 is a diagram illustrating a first example of the common resource according to the first embodiment. In FIG. 15, one section in the time direction indicates one radio frame (or one subframe).

As illustrated in FIG. 15, the common resource (a set of resources) is a part of the uplink radio resource of the eNB 200. As an example, the common resource is formed of a plurality of resource blocks (PRBs: Physical Resource Blocks). Based on the notification request and the setting information received from the eNB 200, a UE #1 to a UE #6 transmit the CE level notification to the eNB 200 by using the resource blocks included in the common resource. The resource blocks may be randomly selected.

In the example of FIG. 15, the UE #1 selects a resource block A, the UE #2 selects a resource block B, the UE #3 selects a resource block C, and the UE #4 to the UE #6 select a resource block D. That is, a collision of resource blocks occurs among the UE #4 to the UE #6. The eNB 200 may fail to decode the CE level notification transmitted by using the resource block D in which the collision occurs. On the other hand, since no collision occurs among the resource blocks A, B, and C, the eNB 200 successfully decodes the CE level notification in each of the UE #1 to the UE #3. The number of resource blocks used for transmitting the CE level notification is not limited to one, and may be two or more. The number of resource blocks used for transmitting the CE level notification may be set by the eNB 200 as one of the parameters of the setting information.

Figure 16:
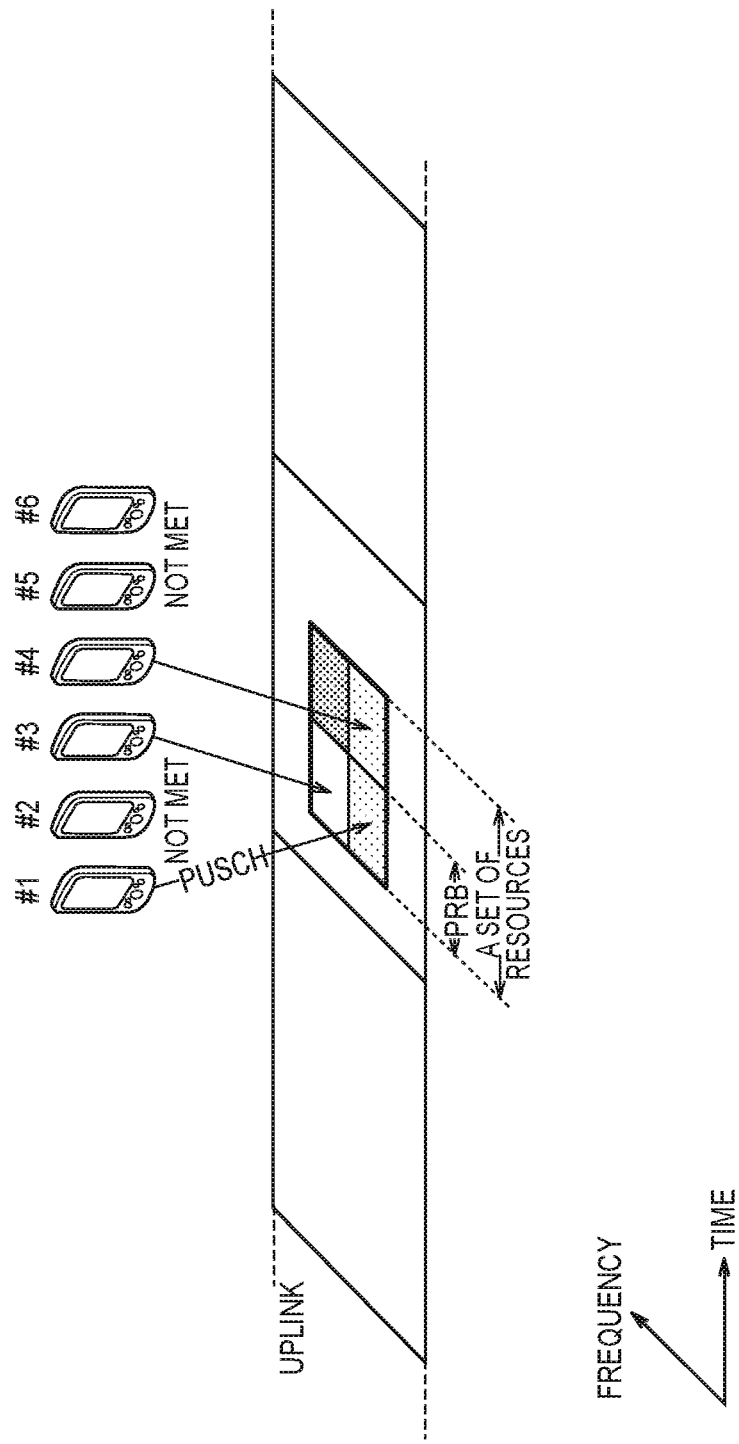
FIG. 16 is a diagram illustrating a second example of the common resource according to the first embodiment.
Figure 17:
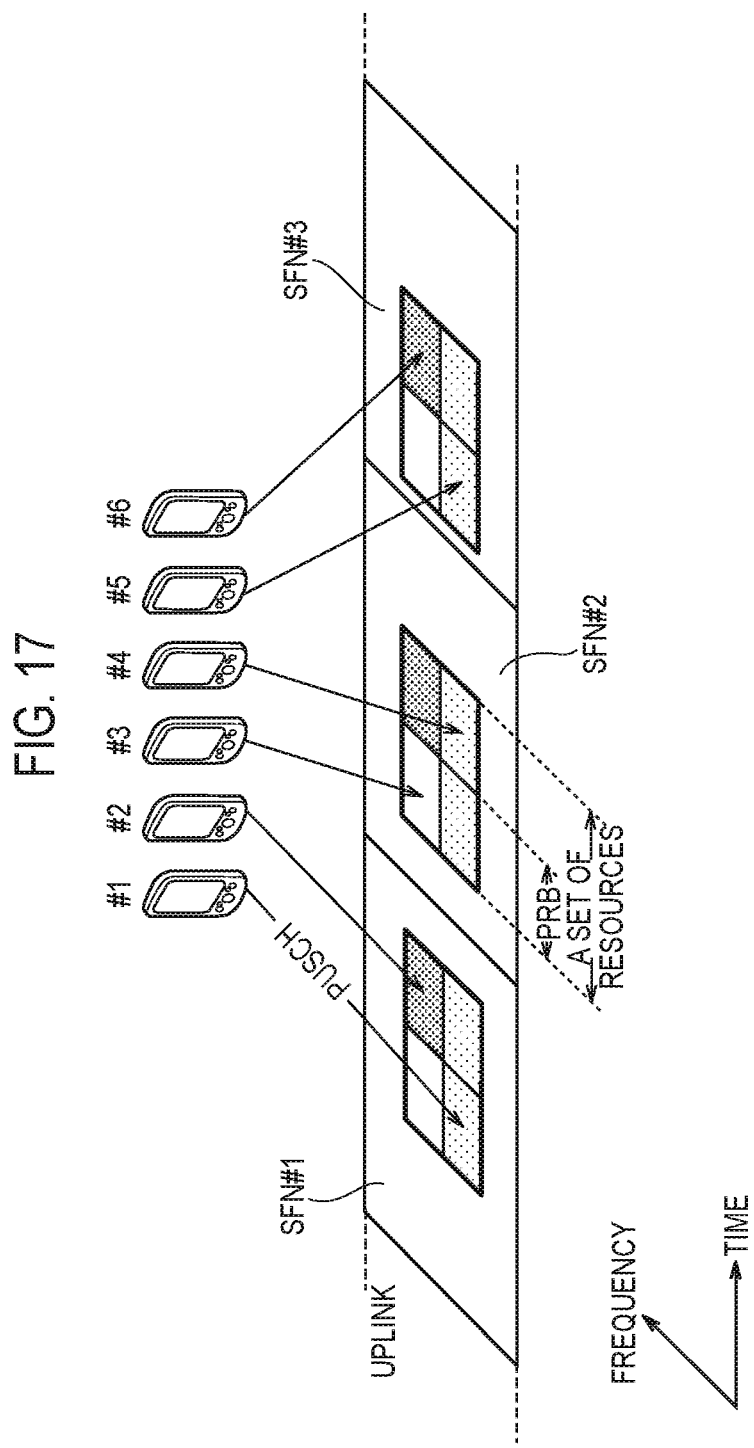
FIG. 17 is a diagram illustrating the second example of the common resource according to the first embodiment.

FIG. 16 and FIG. 17 are diagrams each illustrating a second example of the common resource according to the first embodiment. The second example is an example of lowering a possibility of collision of resources among a plurality of UEs 100. As an example, the UE 100 acquires a random number generated by the UE 100 or a unique identifier of the UE 100. The unique identifier may be an IMSI (International Mobile Subscriber Identity). Alternatively, the unique identifier may be an S-TMSI (SAE-Temporary Mobile Subscriber Identity) or may be a telephone number. Alternatively, the unique identifier may be an identifier assigned to the UE 100 by the eNB 200. The UE 100 determines whether or not transmission of the CE level notification is permitted, based on the random number or the unique identifier. The UE 100 may determine a transmission timing of the CE level notification, based on the random number or the unique identifier. The transmission timing may be defined by a system frame number (SFN) for identifying a radio frame, or may be defined by a subframe number for identifying a subframe frame. Further, the UE 100 may receive a predetermined value transmitted from the eNB 200. The predetermined value may be a threshold value or a variable for determining whether or not the random number or the unique identifier satisfies a predetermined condition. The UE 100 may determine whether or not the transmission of the CE level notification is permitted, based on the random number or the unique identifier and also based on the predetermined value. The UE 100 may determine the transmission timing of the CE level notification, based on the random number or the unique identifier and also based on the predetermined value.

As illustrated in FIG. 16, each of the UE #1 to the UE #6 determines whether or not transmission of the CE level notification of each of the UE #1 to the UE #6 is permitted. In the example of FIG. 16, the UE #1, the UE #3, and the UE #4 satisfy the conditions, but the UE #2, the UE #5, and the UE #6 do not satisfy the conditions. In this case, the UE #1, the UE #3, and the UE #4 transmit the CE level notification by using resource blocks in the common resource. On the other hand, the UE #2, the UE #5, and the UE #6 are prohibited from transmitting the CE level notification. As an example, the UE 100 generates a random number (in a range of 0 to 1), and compares the threshold value (in a range of 0 to 1) notified from the eNB 200 with the random number. When the random number satisfies a threshold value condition, the UE 100 determines that the transmission of the CE level notification is permitted, and enables a transmission function of the CE level notification. "The random number satisfying the threshold value condition" may be that the random number exceeds the threshold value condition, or may be that the random number falls below the threshold condition. On the other hand, when the random number does not satisfy the threshold value condition, the UE 100 determines that transmission of the CE level notification is not permitted and disables the transmission function of the CE level notification. As another example, the UE 100 acquires the IMSI of the UE 100 and determines whether or not the IMSI satisfies a condition defined by variables ("N", "T") notified from the eNB 200. As such a condition, a conditional expression "(IMSI) mod (N)=(T)" may be used. In the conditional expression, instead of using the IMSI itself, a value based on the IMSI (for example, IMSI mod 1024) may be used. In the conditional expression, an inequality (>, <, ≤, or ≥) may be used instead of using an equation. When the IMSI satisfies the condition, the UE 100 determines that the transmission of the CE level notification is permitted, and activates the transmission function of the CE level notification. On the other hand, when the IMSI does not satisfy the condition, the UE 100 determines that the transmission of the CE level notification is not permitted, and disables the transmission function of the CE level notification.

As illustrated in FIG. 17, each of the UE #1 to the UE #6 determines the transmission timing of the CE level notification of each of the UE #1 to the UE #6, based on the IMSI (or the random number). In the example of FIG. 17, the UE #1 and the UE #2 determine SFN #1 as the transmission timing of the CE level notification, the UE #3 and the UE #4 determine SFN #2 as the transmission timing of the CE level notification, and the UE #5 and the UE #6 determine SFN #3 as the transmission timing of the CE level notification. In this way, the transmission timings of the CE level notifications of the plurality of UEs can be dispersed in the time direction. As an example, the UE 100 (controller 130) acquires the IMSI of the UE 100 and determines an SFN that satisfies a condition defined by a variable ("N") notified from the eNB 200 and the IMSI. As such a condition, a conditional expression of "(IMSI) mod (N)=(SFN) mod (N)" may be used. In the conditional expression, instead of using the IMSI itself, a value based on the IMSI (for example, IMSI mod 1024) may be used. The UE 100 decides to transmit the CE level notification in the SFN that satisfies the condition. On the other hand, the UE 100 decides not to transmit the CE level notification in the SFN that does not satisfy the condition. As another example, a random number may be used instead of the IMSI.

Figure 18A:
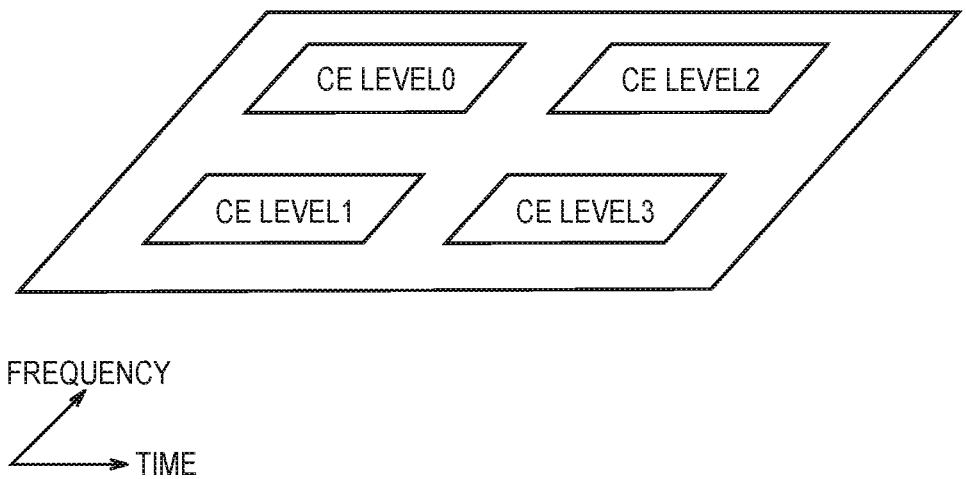
FIGS. 18A and 18B are diagrams illustrating a third example of the common resource according to the first embodiment.
Figure 18B:
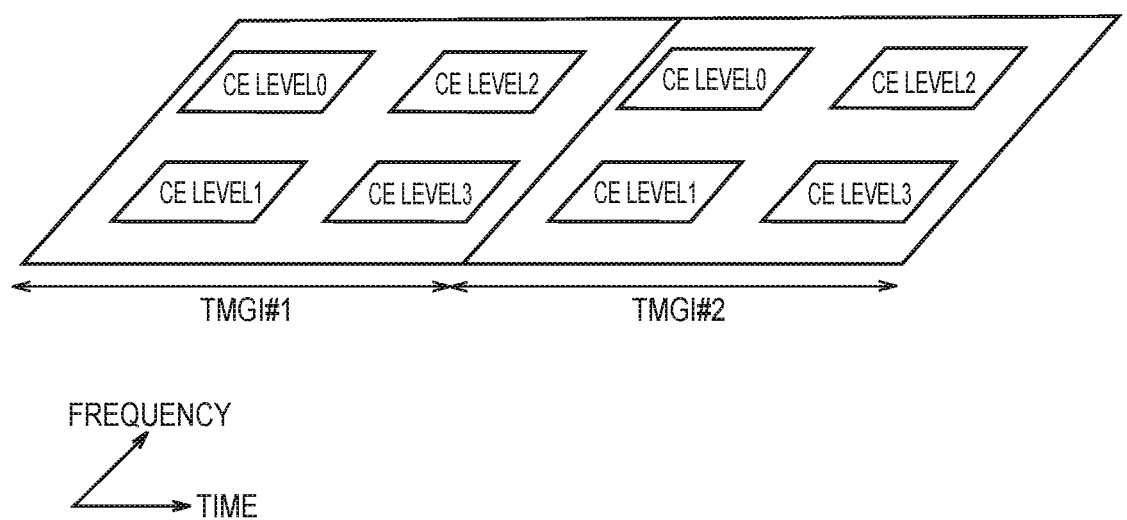

FIG. 18 is a diagram illustrating a third example of the common resource according to the first embodiment. In the third example, the setting information indicates a plurality of common resources including common resources corresponding to a plurality of CE levels. The UE 100 selects the common resource corresponding to the CE level of the UE 100 from among the plurality of common resources and transmits the CE level notification to the eNB 200 by using the resource included in the selected common resource. In this manner, the CE level and the common resource are associated. Introduction of such a corresponding relationship makes it possible to reduce an information amount of the CE level notification. As an example, the CE level notification may be configured by a 1-bit flag such as a scheduling request (SR). By counting the CE level notification for each common resource, the eNB 200 grasps the CE level of each UE 100 receiving or being interested in receiving the MBMS service.

As illustrated in FIG. 18(*a*), four common resources corresponding to CE level 0 to CE level 3 are set. The UE 100 selects the common resource corresponding to the CE level of the UE 100 from among the plurality of common resources and transmits the CE level notification to the eNB 200 by using the resource included in the selected common resource.

As illustrated in FIG. 18(*b*), the TMGI and the CE level may be associated with each of the plurality of common resources. As an example, setting is performed such that a common resource is associated with TMGI #1 and CE level 0, a common resource is associated with TMGI #1 and CE level 1, . . . The eNB 200 may transmit to the UE 100 information indicating the corresponding relationship between the TMGI, the CE level, and the common resource in the setting information. The UE 100 may select a plurality of common resources corresponding to the service identifiers (TMGIs) of MBMS services that the UE 100 is receiving or interested in receiving the MBMS service, and further select the common resource corresponding to the CE level of the UE 100 from among the plurality of common resource.

Second Embodiment

A second embodiment will be described while focusing on differences from the first embodiment, below.

In the first embodiment, the eNB 200 determines the repetition count and/or the MCS to be applied to the MBMS service distributed by the SC-PTM, based on the CE level notification received from the UE 100. On the other hand, in the second embodiment, in addition to or in place of the CE level notification received from the UE 100, the eNB 200 determines the repetition count and/or the MCS, based on information received from another network device. The eNB 200 according to the second embodiment includes a receiver (backhaul communication unit 240) configured to receive from another network device a notification indicating the CE level to be applied to the MBMS service, and a controller 230 configured to distribute the MBMS service by using a coverage enhancement technique including the repetition, based on the notification. The other network device may be the MME 300 or the MCE 11.

FIG. 19 is a flowchart illustrating an operation example of the second embodiment.

As illustrated in FIG. 19, in step S301, the UE 100 may notify the GCS-AS 31 or the BM-SC 22 of the CE level of the UE 100. As an example, the UE 100 notifies the changed CE level every time the CE level of the UE 100 changes. The GCS-AS 31 or the BM-SC 22 may grasp the CE level of each UE 100 receiving or being interested in receiving the MBMS service, determine the CE level (the repetition count and/or the MCS) applied to the MBMS service, and notify the MME 300 or the MCE 11 of the determined CE level (step S302).

Alternatively, in step S303, the UE 100 may notify the MME 300 or the MCE 11 of the CE level of the UE 100. Alternatively, in step S304, the eNB 200 may notify the MME 300 or the MCE 11 of the CE level of the UE 100 grasped during the random access procedure. As an example, the eNB 200 notifies the MME 300 of the repetition count (CE level) of the MPDCCH when the UE context is released.

The MME 300 or the MCE 11 may determine and/or manage the CE level for each MBMS service, based on the notified CE level.

In step S305, the MME 300 or the MCE 11 notifies the eNB 200 of the CE level for each MBMS service (TMGI). As an example, the MME 300 or the MCE 11 notifies the eNB 200 of the CE level for each TMGI by a message (MBMS Session Start/Modification) or the like for starting or changing the distribution of the MBMS service.

In step S306, the eNB 200 determines or changes the repetition count and/or the MCS applied to the MBMS service distributed by the SC-PTM, based on the notified CE level. Then, the eNB 200 distributes the MBMS service by the SC-PTM by using the determined or changed repetition count and/or MCS.

Third Embodiment

A third embodiment will be described while focusing on differences from the first and second embodiments below.

The third embodiment is an embodiment in which the UE 100 can continuously receive the MBMS service in a scenario where the UE 100 in the RRC idle state present in the enhanced coverage performs MBMS reception.

The UE 100 according to the third embodiment includes the controller 130 configured to perform a cell reselection operation for selecting a cell used as a serving cell in the RRC idle state. If a coverage enhancement technique involving the repetition is needed in the UE 100 (that is, if the UE 100 is present in the enhanced coverage), the controller 130 selects a cell based on a ranking based on a radio quality.

Specifically, if the current serving cell cannot be accessed unless using the coverage enhancement technique, the UE 100 applies a ranking using an "S-criteria" and an "R-criteria" for the enhanced coverage to the same frequency (intra-frequency) and another frequency (inter-frequency). In other words, the UE 100 present in the enhanced coverage preferentially selects a cell with the best radio quality (reception level) without considering a frequency priority. An operation in this case is similar to the operation where "(B2) The priority of the frequency of the neighbouring cell is identical to the priority of the current serving cell" of the "Outline of cell reselection operation".

However, in such a method, the UE 100 may select a frequency or a cell for which the MBMS service is not distributed. Therefore, there is a possibility that the UE 100 receiving or being interested in receiving the MBMS service cannot continuously receive the MBMS service.

Therefore, even if the coverage enhancement technique is required for the UE 100, if the UE 100 is receiving or interested in receiving the MBMS service, the UE 100 according to the third embodiment preferentially selects a cell belonging to the frequency for distributing the MBMS service, without using the ranking. As an example, if interested in receiving the MBMS service distributed by the SC-PTM, the UE 100 present in the enhanced coverage considers the frequency (or the cell) for distributing the MBMS service as the highest priority and does not perform the ranking. As a result, even the UE 100 present in the enhanced coverage can continuously receive the MBMS service.

The operation according to the third embodiment may be defined as "if being able to receive an MBMS service only while camping at a frequency for providing the MBMS service, a UE receiving or being interested in receiving the MBMS service can consider the frequency as the highest priority, irrespective of the UE being present in the enhanced coverage". Alternatively, the operation according to the third embodiment may be defined as "if the current serving cell cannot be accessed unless using the coverage enhancement technique, and if the frequency having the highest priority for providing the MBMS service is not set, a ranking using "S-criteria" or the "R-criteria" for the enhanced coverage is applied to the same frequency (intra-frequency) and another frequency (inter-frequency)."

Figure 20:
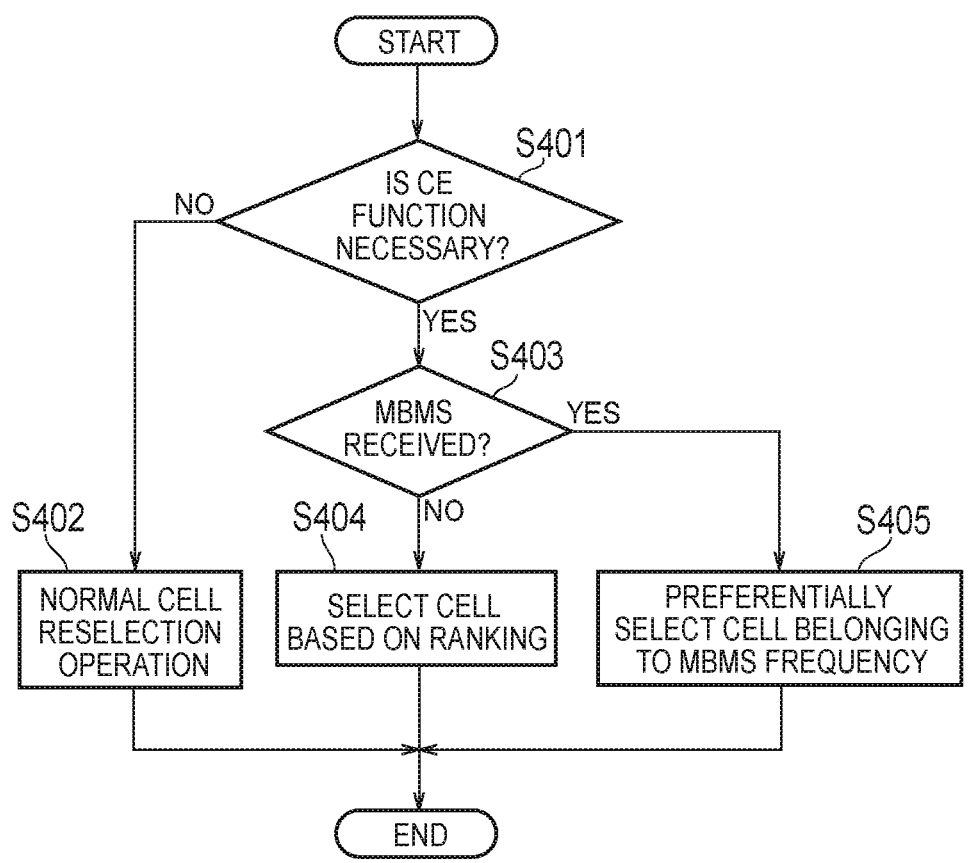
FIG. 20 is a flowchart illustrating an operation example of a third embodiment.

FIG. 20 is a flowchart illustrating an operation example of the third embodiment.

As illustrated in FIG. 20, in step S401, the UE 100 in the RRC idle state determines whether or not the coverage enhancement technique is required for the UE 100 (that is, whether or not the UE 100 is present in the enhanced coverage).

If the coverage enhancement technique is not required for the UE 100 (step S401: NO), in step S402, the UE 100 performs a normal cell reselection operation such as in the "Outline of cell reselection operation" described above.

On the other hand, if the coverage enhancement technique is required for the UE 100 (step S401: YES), in step S403, the UE 100 determines whether or not the UE 100 is receiving or interested in receiving the MBMS service.

If the UE 100 is not receiving the MBMS service and is not interested in receiving the MBMS service (step S403: NO), in step S404, the UE 100 preferentially selects a cell having the best radio quality, by using the ranking without considering the frequency priority.

On the other hand, if the UE 100 is receiving or interested in receiving the MBMS service (step S403: YES), in step S405, the UE 100 preferentially selects a cell belonging to the frequency for distributing the MBMS service, without performing the ranking.

Other Embodiments

In the above-described embodiments, the case where the "CE level" is transmitted and received is mainly described, but the "CE level" may be replaced with the "repetition count".

In the above-described embodiments, the example where the RSRP is used as the index value of the reception state in the UE 100 is described, but an index value other than the RSRP may be used. As an example, RSRQ (Reference Signal Received Quality) or RS-SINR (Reference Signal signal-to-interference-plus-noise ratio) may be used as the index value of the reception state.

Each of the above-described embodiments may be implemented independently; two or more embodiments may be combined and implemented. For example, a part of the processing according to one embodiment may be added to another embodiment. Alternatively, the part of the processing according to one embodiment may be replaced by a part of the configuration of another embodiment.

In the above-described embodiments, a firmware distribution is assumed as the MBMS service. However, an MBMS service such as a group message distribution, a group chat message distribution, a distribution of a virus definition file, a scheduled update file distribution such as a weather forecast, an unscheduled file distribution such as a news bulletin, a nighttime file distribution (off peak distribution) such as a video content, an audio/video streaming distribution, a telephone/video phone (group communication), a live video distribution, and a radio audio distribution may be assumed.

In the above-described embodiments, the LTE system is exemplified as the mobile communication system. However, the present invention is not limited to the LTE system. The present invention may be applied to a mobile communication system other than the LTE system.

[Supplementary Note]

(1. Introduction)

Discussion on multicast enhancements for FeMTC and eNB-IoT is started. The following agreements are reached.

The Rel-13 SC-PTM architecture is assumed for multicast design for NB-IoT and MTC.

RAN2 assumes that the legacy SC-MTCH mechanism in which the SC-MTCH is scheduled by PDCCH is reused for multi-cast in NB-IoT and MTC to achieve flexible scheduling.

RAN2 assumes that repetition for SC-MTCH transmission will be introduced for multi-cast in NB-IoT and MTC.

The CE level information (e.g. repetitions) is one of the AS configurations for SC-MTCH.

In this supplementary note, the inside of multicast enhancements to support Enhanced Coverage (CE) are discussed.

(2. Discussion)

(2.1. CE Level Information Handling)

It was agreed that "The Rel-13 SC-PTM architecture is assumed for multi-cast design for NB-IoT and MTC", but not concluded which entity handles CE level for multicasting, i.e., the responsibility to decide e.g., the number of repetitions. There are some options as follows;

GCS AS: The GCS AS handles the GCS session and group management, including the knowledge of UE locations, i.e., a list of cell IDs. So, it's a possibility to add the management of CE levels of each UE in each cell, while some CN impact may be foreseen, e.g., MB2 between the GCS AS and the BM-SC.

MME: The MME has the responsibility of a MBMS session management such as start/stop. For Rel-13 paging optimization, the MME is informed by the eNB of CE level for a specific UE, i.e., UEPagingCoverageInformation including mpdcch-NumRepetition, when the UE Context Release is processed. The information may be reused, although the validity is not ensured in case of UE mobility in RRC IDLE.

MCE: The MCE makes the decision of MBMS session control. For SC-PTM, the list of cell ID and QoS of MBMS bearer are informed to the eNB over e.g., MBMS Session Start Request. So, it may be possible to add CE level management per a cell basis, while the RAN specifications will be impacted.

eNB: The eNB manages the radio resources in detail. The eNB has the CE levels for each UE in RRC Connected, but may not for UEs in RRC IDLE. Also, the CE level is informed only when PRACH is transmitted (for MO call) or the paging is initiated (for MT call). So, the eNB doesn't have complete knowledge of CE levels for the UEs interested in SC-PTM, e.g., UEs in RRC IDLE or mobility, while the eNB should has the responsibility if RAN2 sticks to Rel-13 SC-PTM principle, i.e., "Scheduling is done by the eNB".

Each option has pros and cons, as well as no option has the complete knowledge for the decision of CE level for SC-PTM at this point. Considering the CE level is RAN-originated information, it's preferable to be handled within a RAN node, to avoid unnecessary cross-layer interactions. For example, even if either the GCS AS or the MME receives the UE's CE level information then it would anyway need to coordinate with the eNB since the configuration of SC-PTM transmission is decided by the eNB. On the other hand, if the eNB receives the CE level information, this information can be transparent to the core network or the application layer. Also, if it should be assumed the CE level is dynamically changed by UE mobility, the eNB is slightly preferred node to handle the CE level for scheduling.

Proposal 1: The CE level for SC-PTM should be decided by a RAN node, preferably the eNB.

As mentioned above, no entity could have enough knowledge of CE level for Rel-14 multicast enhancements. So, it's the issue how to decide the CE level for a specific MBMS service. A couple of potential approaches could be considered.

Based on a report from the UE: Regardless of which entity decides, the reporting of CE level that the UE is located in, e.g., the report via GC1, is useful for accurate/dynamic decision, i.e., suitable number of repetitions and adaptive MCS. However, it may cause the excessive overhead if the UE needs to report whenever the CE level changes, as pointed out in RAN2. Also, the UE power consumption due to the reporting may be issue.

Blind decision: The entity may blindly decide the CE level for SC-PTM, e.g., to assume the worst case. It's a simple way to transmit SC-PTM with the maximum number of repetitions and the lowest MCS, and may be a baseline at this point. In addition, the repetitions for CE also ensure more robust reception of UEs in normal coverage. However, it does not take full benefit from SC-PTM, i.e., low spectral efficiency due to static/conservative scheduling. In addition, the UE may consume its battery more than it actually needs due to long duration of SC-PTM reception, i.e., lower MCS needs more subframes for delivery of a file to all UEs even if UE in cell centre can actually receive it with higher MCS in shorter period.

If a new reporting is specified, the number of UL signalling should be minimized, to avoid excessive overhead and additional UE consumption.

One of possibilities for the initial CE level determination is that the eNB asks the UE only once whether the MBMS service will be received in Enhanced Coverage, like the existing MBMS Counting procedure. If the UE in IDLE also needs to send the report, it's better to be done without transition to RRC Connected. In this sense, the existing CE level report during RACH procedure could be considered as one of approaches, assuming no need for the eNB to determine which UE sends the report.

Another possibility for the CE level modification during SC-PTM is that the report is only initiated when the UE can no longer receive SC-PTM successfully. It may be integrated within the feedback scheme for retransmission as proposed.

However, it's also considerable to rely on the blind decision in this release just due to the limitation of time unit allocated to this WI, even though it's not a better approach from the technical perspective.

Proposal 2: RAN2 should consider the CE level reporting, taking into account minimum UL signalling and also the time unit allocated for the WI.

(2.2. Cell Reselection)

According to the current idle mode procedure, the UE receiving or interested in an MBMS service may prioritize the frequency providing SC-PTM over the other frequencies, i.e., to consider the highest priority. On the other hand, it's also specified that "Ranking with cell selection criterion S for enhanced coverage is applied for intra-frequency and inter-frequency cell reselection when the current serving cell can only be accessed using enhanced coverage", wherein it seems to handle all the frequencies as equal priority if the UE is in Enhanced Coverage. Since the SC-PTM reception in Enhanced Coverage was not clearly defined in Rel-13, it should be clarified that the current specification allows the UE in Enhanced Coverage to prioritize SC-PTM frequency as it is done in normal coverage. Also, RAN2 should discuss whether some small enhancements are necessary, e.g., to add notes in the specification with the highest priority concept or to enhance the ranking mechanism.

Proposal 3: RAN2 should discuss and clarify whether the UE in Enhanced Coverage is allowed to prioritize the frequency providing multicast service of interest.

INDUSTRIAL APPLICABILITY

The present invention is useful in the mobile communication field.

The invention claimed is:

1. A radio terminal for a mobile communication system, comprising:
   a receiver configured to receive an MBMS service distributed from a base station by using a coverage enhancement technique including a repetition;
   a controller configured to determine whether or not a predetermined event occurs; and
   a transmitter configured to transmit a notification on a coverage enhancement level required by the radio terminal to the base station, in response to occurrence of the predetermined event, wherein
   the predetermined event includes the radio terminal receiving a request from the base station to transmit the notification,
   the receiver is configured to receive from the base station setting information indicating a plurality of common resources shared by a plurality of radio terminals to transmit the notification, the plurality of common resources corresponding to a plurality of coverage enhancement levels and a plurality of Temporary Mobile Group Identity (TMGI) of MBMS services,
   the controller is configured to select, from among the plurality of common resources, a common resource based on a coverage enhancement level of the radio terminal and TMGI which the radio terminal is interested in receiving, and
   the transmitter is configured to transmit the notification by using a resource included in the selected common resource.

2. The radio terminal according to claim 1, wherein the receiver receives the request for transmission of the notification from the base station before starting receiving the MBMS service, and
   the transmitter transmits the notification to the base station in response to reception of the request.

3. The radio terminal according to claim 1, wherein the controller determines whether or not the MBMS service can be normally received after starting receiving the MBMS service, and
   the transmitter transmits the notification to the base station in response to determination that the MBMS service cannot be normally received.

4. The radio terminal according to claim 1, wherein the controller prohibits transmission of a next notification until a predetermined time period elapses since the notification is transmitted, and
   the controller enables transmission of the next notification after the predetermined time period elapses since the notification is transmitted.

5. The radio terminal according to claim 1, wherein the controller prohibits transmission of the notification in response to a reception state being better than a threshold value, and the controller enables transmission of the notification in response to the reception state being poorer than the threshold value.

6. The radio terminal according to claim 1, wherein the controller is configured to determine, in response to receiving the request, whether or not the radio terminal is interested in receiving the MBMS service, and
   the transmitter is configured to:
   transmit the notification in response to determining the radio terminal is interested in receiving the MBMS service; and
   not transmit the notification in response to determining the radio terminal is not interested in receiving the MBMS service.

7. A method comprising:
   receiving, by a radio terminal for a mobile communication system, an MBMS service distributed from a base station by using a coverage enhancement technique including a repetition;
   determining, by the radio terminal, whether or not a predetermined event occurs;
   transmitting, by the radio terminal, a notification on a coverage enhancement level required by the radio terminal to the base station, in response to occurrence of the predetermined event, wherein the predetermined event includes the radio terminal receiving a request from the base station to transmit the notification;
   receiving from the base station setting information indicating a plurality of common resources shared by a plurality of radio terminals to transmit the notification, the plurality of common resources corresponding to a plurality of coverage enhancement levels and a plurality of Temporary Mobile Group Identity (TMGI) of MBMS services;
   selecting, from among the plurality of common resources, a common resource based on a coverage enhancement level of the radio terminal and TMGI which the radio terminal is interested in receiving; and
   transmitting the notification by using a resource included in the selected common resource.

8. A processor controlling a radio terminal for a mobile communication system, the processor configured to execute:
   a process of receiving an MBMS service distributed from a base station by using a coverage enhancement technique including a repetition;
   a process of determining whether or not a predetermined event occurs;
   a process of transmitting a notification on a coverage enhancement level required by the radio terminal to the base station, in response to occurrence of the predetermined event, wherein the predetermined event includes the radio terminal receiving a request from the base station to transmit the notification;
   a process of receiving from the base station setting information indicating a plurality of common resources shared by a plurality of radio terminals to transmit the notification, the plurality of common resources corresponding to a plurality of coverage enhancement levels and a plurality of Temporary Mobile Group Identity (TMGI) of MBMS services;
   a process of selecting, from among the plurality of common resources, a common resource based on a coverage enhancement level of the radio terminal and TMGI which the radio terminal is interested in receiving; and
   a process of transmitting the notification by using a resource included in the selected common resource.

* * * * *